United States Patent
Takatsuka et al.

(10) Patent No.: US 12,142,164 B2
(45) Date of Patent: Nov. 12, 2024

(54) ENCRYPTION DEVICE AND ENCRYPTION METHOD

(71) Applicant: Sony Group Corporation, Tokyo (JP)

(72) Inventors: Susumu Takatsuka, Tokyo (JP); Kenta Kawamoto, Kanagawa (JP); Hiroki Tetsukawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 508 days.

(21) Appl. No.: 17/311,894

(22) PCT Filed: Jan. 22, 2020

(86) PCT No.: PCT/JP2020/002120
§ 371 (c)(1),
(2) Date: Jun. 8, 2021

(87) PCT Pub. No.: WO2020/158539
PCT Pub. Date: Aug. 6, 2020

(65) Prior Publication Data
US 2022/0028301 A1   Jan. 27, 2022

(30) Foreign Application Priority Data
Jan. 30, 2019  (JP) ................................ 2019-013967

(51) Int. Cl.
*G09C 1/00* (2006.01)
*H04L 9/08* (2006.01)

(52) U.S. Cl.
CPC .............. *G09C 1/00* (2013.01); *H04L 9/0869* (2013.01); *H04L 2209/12* (2013.01)

(58) Field of Classification Search
CPC ...... G09C 1/00; H04L 9/0869; H04L 2209/12
(Continued)

(56) References Cited

U.S. PATENT DOCUMENTS 7,020,283 B1 * 3/2006 Wada ...................... G06F 7/588
380/46
7,240,208 B1 * 7/2007 Oakley ................. H04L 9/0897
380/246
(Continued)

FOREIGN PATENT DOCUMENTS

JP    2005-333382 A    12/2005
JP    2006-5803 A      1/2006
(Continued)

OTHER PUBLICATIONS

Peng Zhang et al.: "Privacy enabled video surveillance using a two state Markov tracking algorithm", Multimedia Systems, Springer, Berlin, DE, vol. 18, No. 2, Aug. 20, 2011 (Aug. 20, 2011), pp. 175-199, XP035018859, ISSN: 1432-1882, DOI: 10.1007/S00530-011-0247-8* sections 2 to 4*.
(Continued)

*Primary Examiner* — Thanh T Le
(74) *Attorney, Agent, or Firm* — Michael Best & Friedrich LLP

(57) ABSTRACT

An encryption device includes: an encryption key generation unit that generates an encryption key on the basis of photoelectric random numbers that are random numbers obtained on the basis of photoelectric conversion performed by an array sensor in which a plurality of pixels having light-receiving elements for visible light or non-visible light are one-dimensionally or two-dimensionally arranged; and an encryption unit that performs encryption of a target signal on the basis of the encryption key generated by the encryption key generation unit. Accordingly, it is possible to realize encryption that makes deciphering of an encryption key more difficult as compared to a case in which pseudo-random numbers are used, and thus it is possible to promote improvement of security.

11 Claims, 18 Drawing Sheets

(58) Field of Classification Search
USPC .......................................................... 380/46
See application file for complete search history.

(56) References Cited

U.S. PATENT DOCUMENTS

| | | | | |
|---|---|---|---|---|
| 7,636,847 | B2* | 12/2009 | Stone | G06F 21/10 |
| | | | | 713/176 |
| 8,107,397 | B1* | 1/2012 | Bagchi | H04L 9/0833 |
| | | | | 380/278 |
| 9,374,370 | B1* | 6/2016 | Bent | H04W 12/068 |
| 9,860,438 | B2* | 1/2018 | Nakata | G02B 7/34 |
| 9,985,062 | B2* | 5/2018 | Jung | H01L 23/373 |
| 10,848,473 | B1* | 11/2020 | James | H04L 9/0894 |
| 11,626,982 | B1* | 4/2023 | Griffin | H04L 9/0891 |
| | | | | 380/286 |
| 2005/0190913 | A1* | 9/2005 | Wada | H04L 9/302 |
| | | | | 380/44 |
| 2007/0230823 | A1* | 10/2007 | Weng | H04N 23/64 |
| | | | | 348/E5.042 |
| 2009/0262928 | A1* | 10/2009 | Busari | G06F 7/588 |
| | | | | 708/250 |
| 2012/0008776 | A1* | 1/2012 | Ishida | H04W 12/041 |
| | | | | 380/247 |
| 2012/0138774 | A1 | 6/2012 | Kelly et al. | |
| 2013/0138970 | A1* | 5/2013 | Resch | G06F 3/0641 |
| | | | | 713/189 |
| 2014/0282877 | A1* | 9/2014 | Mahaffey | H04W 12/33 |
| | | | | 726/3 |
| 2016/0259625 | A1* | 9/2016 | Scarlett | H04L 9/0852 |
| 2017/0170967 | A1* | 6/2017 | Luo | H04L 9/3247 |
| 2017/0180695 | A1* | 6/2017 | Tanaka | G02B 23/26 |
| 2017/0206528 | A1* | 7/2017 | Han | G06Q 20/382 |
| 2018/0020149 | A1* | 1/2018 | Tanimoto | G03B 13/36 |
| 2018/0063401 | A1* | 3/2018 | Kobuse | H04N 23/76 |
| 2018/0080877 | A1* | 3/2018 | Hirawake | H04N 23/73 |
| 2018/0152610 | A1* | 5/2018 | Ono | G03B 19/07 |
| 2018/0227125 | A1* | 8/2018 | Davis | H04L 9/0861 |
| 2018/0260192 | A1* | 9/2018 | Choi | G01J 1/0238 |
| 2019/0201555 | A1* | 7/2019 | Shinaoka | A61K 49/04 |
| 2019/0236745 | A1* | 8/2019 | Kulkarni | H04L 9/0662 |
| 2019/0245692 | A1* | 8/2019 | Jaroch | G06F 21/602 |
| 2019/0253675 | A1* | 8/2019 | Ioka | H04N 1/6027 |
| 2019/0377553 | A1* | 12/2019 | Maynard | G06F 7/58 |
| 2019/0392194 | A1* | 12/2019 | Croxford | G06F 17/15 |
| 2020/0035724 | A1* | 1/2020 | Machida | H04N 25/771 |
| 2020/0050748 | A1* | 2/2020 | Guo | G06F 21/12 |
| 2020/0065526 | A1* | 2/2020 | Berman | G06T 1/0028 |
| 2020/0137335 | A1* | 4/2020 | Ohdaira | H04N 25/79 |
| 2020/0184112 | A1* | 6/2020 | Wallach | G06F 21/72 |
| 2020/0192932 | A1* | 6/2020 | Deiseroth | G06F 16/587 |
| 2020/0209412 | A1* | 7/2020 | Inoue | G01T 1/20181 |
| 2021/0019899 | A1* | 1/2021 | Ono | G02B 27/0075 |
| 2021/0127080 | A1* | 4/2021 | Okura | H04N 1/028 |
| 2021/0250487 | A1* | 8/2021 | Satou | G03B 7/08 |
| 2021/0315520 | A1* | 10/2021 | Leussler | A61B 5/708 |
| 2022/0035959 | A1* | 2/2022 | Mobley | H04L 9/0866 |

FOREIGN PATENT DOCUMENTS

| | | |
|---|---|---|
| JP | 2008-197847 A | 8/2008 |
| JP | 2009-027333 A | 2/2009 |
| TW | 201703455 A | 1/2017 |

OTHER PUBLICATIONS

Extended European Search Report dated Jan. 25, 2022 for corresponding European Application No. 20748913.9.
International Search Report (PCT/ISA/210), International Application No. PCT/JP2020/002120, dated Mar. 30, 2020.
Notification of Transmittal of the International Search Report and the Written Opinion of the International Searching Authority, or the Declaration (PCT/ISA/220), International Application No. PCT/JP2020/002120, dated Apr. 7, 2020.
Written Opinion of the International Search Authority (PCT/ISA/237), International Application No. PCT/JP2020/002120, dated Apr. 7, 2020.

* cited by examiner

STILL IMAGE (SEED FRAME)

ENCRYPTION FILTER
(ENCRYPTION KEY)

Fig. 11
A
B
C
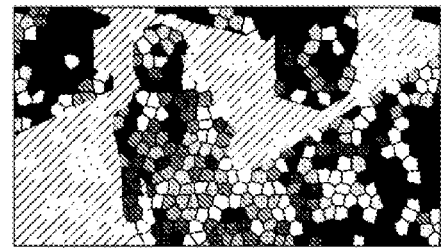
D

Fig. 12
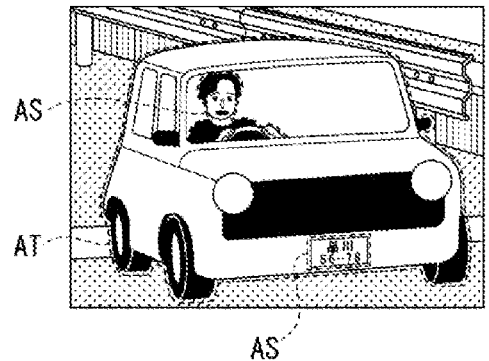
A
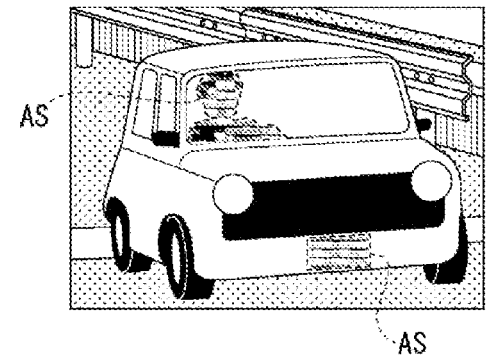
B
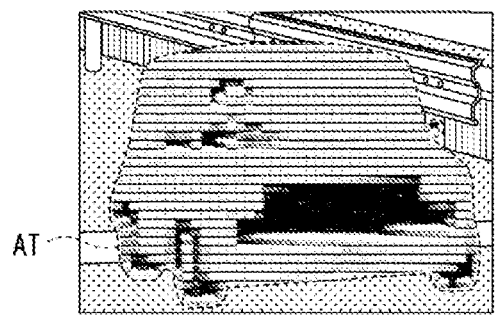
C
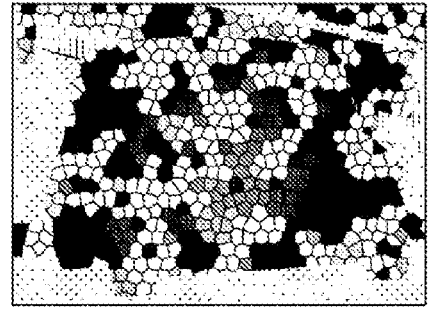
D

ENCRYPTION DEVICE AND ENCRYPTION METHOD

TECHNICAL FIELD

The present technology relates to an encryption device and an encryption method, and particularly, to a technical field with respect to encryption using true random numbers as random numbers.

BACKGROUND ART

There are cases in which encryption is performed on an image signal obtained through imaging using an array sensor (image sensor) in which a plurality of light-receiving elements are arranged. For example, a case in which encryption is performed on an image signal obtained through imaging using a monitoring camera such that a person who is the subject is not able to be identified, and the like may be conceived.

Meanwhile, encryption of a captured image is disclosed as a related conventional technology in Patent Literature 1 below.

CITATION LIST

Patent Literature

[PTL 1]
JP 2009-027333 A

SUMMARY

Technical Problem

However, in conventional encryption performed on an image signal and the like, pseudo-random numbers generated using software are used as random numbers used for an encryption key in many cases, and thus there is a risk that the encryption key will be deciphered and copied.

An object of the present technology in view of the aforementioned circumstances is to promote improvement of security by realizing encryption in which it is more difficult to decipher an encryption key than in a case using pseudo-random numbers.

Solution to Problem

An encryption device according to the present technology includes: an encryption key generation unit that generates an encryption key on the basis of photoelectric random numbers that are random numbers obtained on the basis of photoelectric conversion performed by an array sensor in which a plurality of pixels having light-receiving elements for visible light or non-visible light are one-dimensionally or two-dimensionally arranged; and an encryption unit that performs encryption of a target signal on the basis of the encryption key generated by the encryption key generation unit.

Accordingly, it is possible to realize encryption that makes deciphering of an encryption key more difficult as compared to a case in which pseudo-random numbers are used.

In the aforementioned encryption device according to the present technology, it may be conceived that the encryption key generation unit generate the encryption key by acquiring values of electrical signals of the pixels, obtained through the photoelectric conversion, as the photoelectric random numbers.

Accordingly, it is possible to generate an encryption key that is difficult to decipher.

In the aforementioned encryption device according to the present technology, it may be conceived that the encryption unit perform encryption based on the encryption key on an image signal obtained through imaging in the array sensor.

Accordingly, it is possible to perform encryption on an image signal according to an encryption key obtained by allocating a coefficient for encryption to each pixel of the array sensor.

In the aforementioned encryption device according to the present technology, it may be conceived that the encryption key generation unit generate the encryption key in a form in which at least parts of the values of the electrical signals of the pixels are allocated to pixei positions different from pixel positions at which the values of the corresponding electrical signals are obtained.

Accordingly, it becomes more difficult to decipher the encryption key as compared to a case in which an encryption key in which values of electrical signals of pixels are allocated as they are to pixel positions at which the values of the electrical signals are obtained is used.

In the aforementioned encryption device according to the present technology, it may be conceived that the encryption key generation unit generate the encryption key on the basis of photoelectric random numbers obtained in a frame period different from a frame period of the image signal that is an encryption target of the encryption unit.

Accordingly, the difficulty of inferring an encryption key from an encrypted image is enhanced.

In the aforementioned encryption device according to the present technology, it may be conceived that the encryption key generation unit re-acquire the photoelectric random numbers when uniformity in the values of the electrical signals in at least some of the pixels is recognized.

Accordingly, it is possible to prevent execution of encryption according to an encryption key based on random numbers with a low randomness.

In the aforementioned encryption device according to the present technology, it may be conceived that the encryption key generation unit, the encryption unit, and the array sensor be configured in a single package.

Accordingly, it is possible to promote tamper-proofness in terms of hardware.

In the aforementioned encryption device according to the present technology, it may be conceived that the encryption key generation unit re-acquire the photoelectric random numbers upon detection of unauthorized access from outside of the encryption device.

Accordingly, it is possible to perform encryption based on the re-acquired photoelectric random numbers after detection of unauthorized access from the outside.

In the aforementioned encryption device according to the present technology, it may be conceived that the encryption key generation unit delete an encryption key generated in the past from a memory upon re-acquisition of the photoelectric random numbers.

Accordingly, it is possible to prevent leaking of an encryption key used for encryption in the past.

In the aforementioned encryption device according to the present technology, it may be conceived that the encryption key generation unit delete an image signal that was a source of the photoelectric random numbers from the memory upon generation of the encryption key.

Accordingly, it is possible to prevent leaking of an image that was a source of photoelectric random numbers and inferring of the photoelectric random numbers.

In the aforementioned encryption device according to the present technology, it may be conceived that the encryption unit encrypt the target signal through a stream encryption method.

Accordingly, pre-processing of encryption for the target signal is unnecessary.

An encryption method according to the present technology is an encryption method including: generating an encryption key on the basis of photoelectric random numbers that are random numbers obtained on the basis of photoelectric conversion performed by an array sensor in which a plurality of pixels having light-receiving elements for visible light or non-visible light are one-dimensionally or two-dimensionally arranged; and performing encryption of a target signal on the basis of the generated encryption key.

The same operation as that of the aforementioned encryption device according to the present technology can also be obtained by this encryption method.

BRIEF DESCRIPTION OF DRAWINGS

FIG. 11 is a diagram illustrating images of stepwise encryption in a case where a target class is a person.

FIG. 12 is a diagram illustrating images of stepwise encryption in a case where a target class is a vehicle.

FIG. 20 is an explanatory diagram with respect to examples of generation of an encryption key to which random number values have been allocated in units of a color unit.

DESCRIPTION OF EMBODIMENTS

Hereinafter, embodiments will be described in the following order.
<1. First Embodiment>
[1-1. Configuration of Sensor Device]
[1-2. Concerning Random Numbers used for Encryption]
[1-3. Concerning Signal Used as Processing Target]
[1-4. Concerning Tamper-Proofness]
[1-5. Processing Procedure]
[1-6. Example of Output of Analysis Information]
[1-7. Concerning Transfer of Key]
<2. Second Embodiment>
[2-1. Encryption Method of Second Embodiment]
[2-2. Processing Procedure]
[2-3. Example of Output of Analysis Information]
<3. Modified Example>
<4. Summary of Embodiments>
<5. Present Technology>

Meanwhile, as an embodiment which will be described below, a sensor device 1 as an image sensor that has a light-receiving element array and outputs an image signal as a detected signal is exemplified. Particularly, the sensor device 1 of the embodiment is a device that has an object detection function according to image analysis and can be called an intelligent array sensor.

1. First Embodiment

[1-1. Configuration of Sensor Device]

Figure 1:
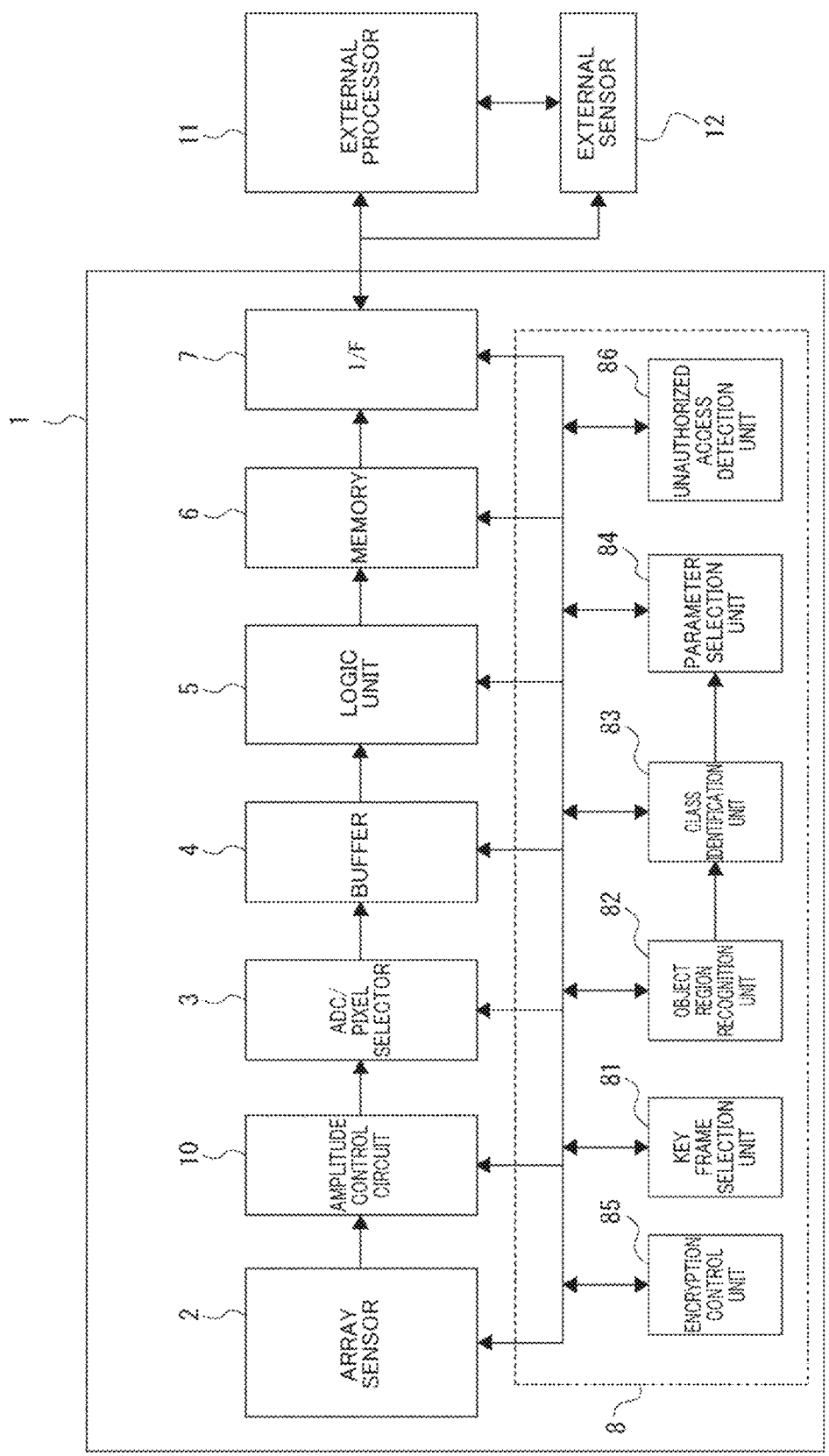
FIG. 1 is a block diagram of a sensor device as an embodiment according to the present technology.

An example of a configuration of the sensor device 1 is illustrated in FIG. 1. Further, FIG. 1 also illustrates an external processor 11 and an external sensor 12 as external devices that perform data communication with the sensor device 1. The external processor 11 is assumed to be a general-purpose processor connected to the sensor device 1 through communication.

The sensor device 1 includes, as hardware, an image sensor device, a memory device such as a dynamic random access memory (DRAM), and a component part as an artificial intelligence (AI) functional processor. In addition, these three components are combined into an integrated device in a 3-layer stack structure, a 1-layer, so called a horizontally mounted configuration, a 2-layer (e.g., the memory device and the AI functional processor are on the same layer) stack structure, or the like.

As illustrated in FIG. 1, the sensor device 1 includes an array sensor 2, an amplitude control circuit 10, an analog-to-digital converter (ADC)/pixel selector 3, a buffer 4, a logic unit 5, a memory 6, an interface 7, and an arithmetic operation unit 8.

The array sensor 2 is configured in such a manner that a detection element is configured as a light-receiving element for visible light or non-visible light and a plurality of pixels each having the light-receiving element are one-dimensionally or two-dimensionally arranged therein. For example, the array sensor 2 has a configuration in which a plurality of pixels are two-dimensionally arranged in a row direction and a column direction and a two-dimensional image signal is output according to photoelectric conversion in light-receiving elements of the pixels.

Meanwhile, although it is assumed that the array sensor 2 outputs a two-dimensional image signal as an image sensor in the following description, the array sensor 2 in the sensor device 1 may be configured as a sensor array module in which ultrasonic detection elements are arranged, a sensor array module in which tactile information detection elements are arranged, or the like.

The amplitude control circuit 10 performs amplitude control of an electrical signal (analog signal) photoelectrically converted by the array sensor 2. In the present example, the amplitude control circuit 10 is configured such that it can change an amplification factor on the basis of an instruction from the arithmetic operation unit 8, which will be specifically described later.

An electrical signal photoelectrically converted by the array sensor 2 is input to the ADC/pixel selector 3 through the amplitude control circuit 10. The ADC/pixel selector 3 converts the input electrical signal as an analog signal into digital data and outputs an image signal as the digital data. In addition, the ADC/pixel selector 3 has a pixel selection function for pixels (imaging elements) of the array sensor 2. Accordingly, a photoelectric conversion signal can be acquired with respect to only pixels selected in the array sensor 2, converted into digital data and output. That is, the ADC/pixel selector 3 can output digital data of a photoelectric conversion signal with respect to only selected pixels although digital data of a photoelectric conversion signal with respect to all of valid pixels constituting an image of one frame is output in a conventional technology.

Although an image signal is acquired through the ADC/pixel selector 3 in units of a pixel, an image signal of each frame is temporarily stored in the buffer 4, read out at an appropriate timing, and provided for processing of the logic unit 5.

The logic unit 5 performs various types of necessary processing (image processing) on each input frame image signal.

For example, it is assumed that image quality adjustment is performed through processing such as color correction, gamma correction, color gradation processing, gain processing, and contour emphasis processing in the logic unit 5. In addition, it is also assumed that processing of changing a data size, such as data compression processing, resolution conversion, and frame rate conversion, is performed in the logic unit 5.

Parameters used for each processing are set with respect to each processing performed in the logic unit 5. For example, there are setting values such as color and luminance correction coefficients, a gain value, a compression rate, and a frame rate. The logic unit 5 performs necessary processing using parameters set with respect to each processing. The arithmetic operation unit 8 may set these parameters in the present embodiment.

Image signals processed in the logic unit 5 are stored in the memory 6 configured as, for example, a DRAM or the like.

Further, a DRAM, a static random access memory (SRAM), a magnetoresistive random access memory (MRAM), and the like are conceivable as the memory 6. An MRAM is a memory that stores data using magnetism and is known to use a tunneling magnetoresistive (TMR) element instead of a magnetic core. A TMR element has an extremely thin insulating layer including several atoms interposed between magnetic substances, and an electrical resistance thereof varies according to a direction of magnetization of magnetic layers. A magnetization direction of a TMR element does not change even when power is not supplied, and thus may serve as a nonvolatile memory. Since a write current needs to increase with the progress of miniaturization, a spin torque transfer (STT)-MRAM using an STT in which electrons with uniform spin flow for writing without a magnetic field being used known for miniaturization of a memory cell. Of course, storage elements other than this may be conceived as a specific example of the memory 6.

Image signals stored in the memory 6 are transmitted and output to the external processor 11 or the like through the interface 7 at a necessary timing.

The external processor 11 executes necessary object detection and the like by performing image analysis and image recognition processing on an image signal transmitted from the sensor device 1.

The external processor 11 can also refer to detection information of the external sensor 12.

Here, it is conceivable that the external processor 11 be connected to the sensor device 1 in a wired or wireless manner.

Further, a configuration in which an imaging apparatus including the sensor device 1 has a network communication function and can transmit an image signal (captured image signal) obtained from the sensor device 1 to a computer device (e.g., a cloud server or the like) outside the imaging apparatus, for example, via a network such as the Internet or a local area network (LAN) can be employed. In such a case, for example, a processor in a cloud computing system may be used as the external processor 11, for example.

The arithmetic operation unit 8 is configured, for example, as a single AI processor. In addition, it includes a key frame selection unit 81, an object region recognition unit 82, a class identification unit 83, a parameter selection unit 84, an encryption control unit 85, and an unauthorized access detection unit 86 as executable arithmetic operation functions, as illustrated. Further, these arithmetic operation functions may be configured by a plurality of processors.

The key frame selection unit 81 performs processing of selecting a key frame from frames of an image signal as a moving image according to a predetermined algorithm or instruction.

The object region recognition unit 82 performs processing of detecting a region of an object that is a candidate for detection or recognizing a region (bounding box) surrounding the object that is a detection target in an image (frame) with respect to the object on frames of an image signal photoelectrically converted by the array sensor 2 and obtained by the ADC/pixel selector 3.

An object detected from an image signal means an object that can be a detection target for the purpose of recognition from an image. Although an object that becomes a detection target is determined depending on detection purposes, processing capabilities, application types, and the like of the sensor device 1 and the external processor 11, any object has a possibility of being a detection target mentioned here. Some examples of possible application detection targets include animals, moving objects (vehicles, bicycles, aircraft, and the like), natural objects (vegetables, plants, and the like), industrial products/parts, buildings, facilities, mountains, seas, rivers, stars, the sun, and clouds.

In addition, the object region recognition unit 82 in the present example executes processing of calculating a region of interest (ROI) that is region information representing a region (region of interest) that will be a processing target on the basis of the bounding box.

The class identification unit 83 classifies an object detected by the object region recognition unit 82 into a class.

A class is information indicating a category of an object and classifies objects which are detected as "humans," "vehicles," "aircraft," "vessels," "trucks," "birds," "cats," "dogs," "deer," "frogs," "horses," or the like, for example.

The parameter selection unit 84 stores parameters for signal processing in accordance with each class and selects one or more corresponding parameters using a class, a bounding box, and the like of a detected object identified by the class identification unit 83. Then, the parameter selection unit 84 sets the one or more parameters in the logic unit 5.

Here, processing of various functions performed by the aforementioned arithmetic operation unit 8 is processing that is not performed in a general image sensor and, in the present embodiment, object detection, class recognition, and control based thereon are executed in the image sensor. Accordingly, it is possible to cause an appropriate image signal depending on a detection purpose to be supplied to the external processor 11 or appropriately reduce the amount of data such that detection performance does not deteriorate.

The encryption control unit 85 performs control such that encryption is performed on an image signal obtained through imaging in the array sensor 2. Meanwhile, a specific example of processing performed by the encryption control unit 85 for encryption of such an image signal will be specifically described.

The unauthorized access detection unit 86 detects an unauthorized access from outside of the sensor device 1. Specifically, the unauthorized access detection unit 86 in the present example detects an unauthorized access to data stored in the memory 6 from the outside.

When an unauthorized access is detected, the unauthorized access detection unit 86 records log information of the unauthorized access (e.g., information representing a detection date and time, and a type of the unauthorized access, and the like) in a predetermined region of the memory 6.

[1-2. Concerning Random Numbers used for Encryption]

Here, although the sensor device 1 of the present embodiment performs encryption on an image signal, pseudo-random numbers generated through software are conventionally used as random numbers used for encryption in many cases. However, since pseudo-random numbers are generated through an algorithm of calculating numerical values and true random numbers cannot be generated, there is a risk that an encryption key will be deciphered and copied.

In view of this, photoelectric random numbers are used to generate an encryption key in the present embodiment.

A photoelectric random number means a random number obtained on the basis of photoelectric conversion of the array sensor 2. Specifically, a value of an electrical signal for each pixel obtained through photoelectric conversion of the array sensor 2 is acquired as a photoelectric random number and an encryption key is generated in the present example.

Figure 2:
FIG. 2 is a diagram illustrating an example of a method of generating an encryption filter (encryption key) on the basis of photoelectric random numbers.

FIG. 2 illustrates an example of a method of generating an encryption filter (encryption key) on the basis of photoelectric random numbers.

First, the left side of the figure illustrates values of electrical signals of pixels obtained through photoelectric conversion of the array sensor 2. Specifically, each pixel value (luminance value) of an image (still image) obtained through imaging in the array sensor 2 is used as photoelectric random numbers in the present example.

Hereinafter, a frame image captured in order to obtain photoelectric random numbers, in other words, a frame image that is a source of photoelectric random numbers is represented as a "seed frame."

In the present example, such values of electrical signals themselves of pixels are not used as an encryption key as they are, and an encryption key is generated in a form in which at least parts of values of the electrical signals of the pixels are allocated to pixel positions different from pixel positions at which the values of the corresponding electrical signals are obtained, as illustrated on the right side of the figure. In other words, an encryption key is generated by shuffling pixel positions with respect to values of electrical signals of pixels obtained as photoelectric random numbers.

Accordingly, it is difficult to decipher an encryption key and thus security can be improved as compared to a case in which an encryption key in which values of electrical signals of pixels are allocated as they are to pixel positions at which the values of the electrical signals are obtained is used.

Here, in generation of an encryption key, it is also possible to modulate a value of an electrical signal of each pixel according to a predetermined algorithm and use the modulated values. For example, using a value obtained by multiplying a value of an electrical signal of each pixel by a predetermined coefficient as a random number value of the corresponding pixel is conceivable. Otherwise, when a value of an electrical signal of each pixel includes a value after the decimal point, a method of using a value obtained by converting the last few decimal places after the decimal point into an integer as a random number value at the corresponding pixel position, and the like can also be employed. Further, in generation of an encryption key, shuffling of pixel positions as mentioned above is not necessarily performed and a value of an electrical signal of each pixel itself can be used as an encryption key.

[1-3. Concerning Signal to be Processing Target]

When encryption is performed on an image signal obtained through imaging in the array sensor 2 in a conventional technology, an image signal read out from the array sensor 2 is temporarily stored in a plaintext state in a memory and encryption is performed on the stored image signal in general.

However, when such an encryption method is employed, hacking by which errors are intentionally caused at the time of encryption using malware, the contents of a memory are caused to be output as a dump file, and plaintext in the memory is able to be copied may be brought about.

Accordingly, in the present embodiment, encryption is performed on readout signals from pixels of the array sensor 2 such that image signals according to plaintext are not stored in a memory.

Specifically, in the present example, encryption on readout signals is realized by executing amplitude control using coefficients according to the encryption key illustrated in FIG. 2 on readout signals from pixels of the array sensor 2 through the amplitude control circuit 10 illustrated in FIG. 1.

Figure 3:
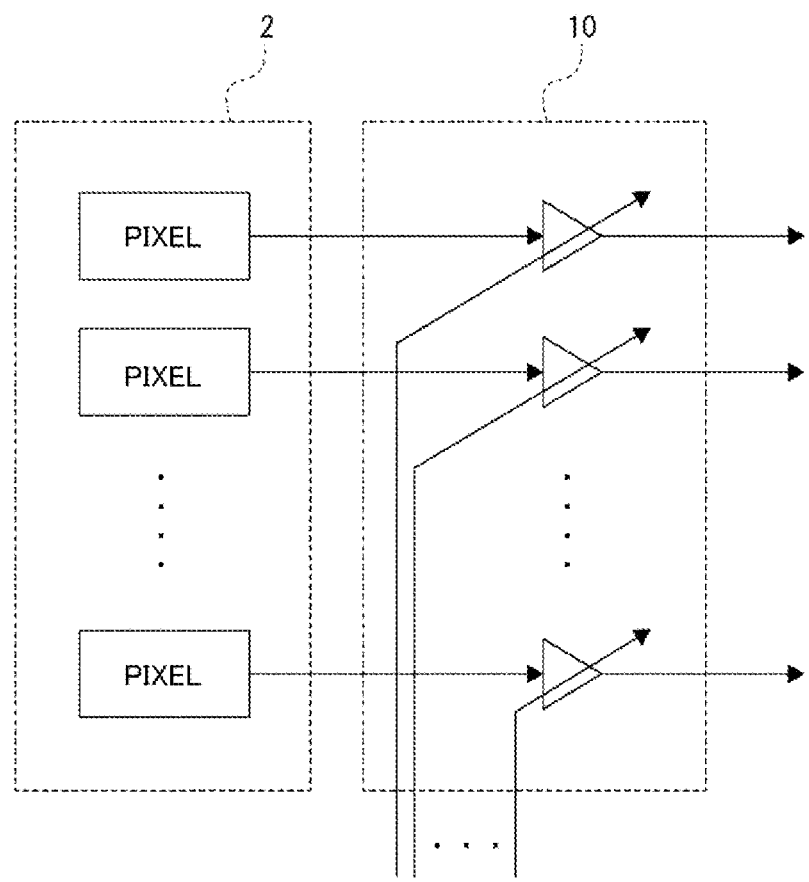
FIG. 3 is a diagram illustrating an image of encryption of a readout signal according to an amplitude control circuit in an embodiment.

FIG. 3 is a diagram illustrating an image of encryption of a readout signal performed by the amplitude control circuit 10.

As illustrated, an amplifier included in the amplitude control circuit 10 multiplies a readout signal (a charge signal in this case) from each pixel in the array sensor 2 by a coefficient according to an encryption key. In the sensor device 1 illustrated in FIG. 1, the amplitude of a readout signal of each pixel is controlled in an analog signal phase in this manner, and then the readout signal is AD-converted by the ADC/pixel selector 3 and stored in the memory 6 through the buffer 4 and the logic unit 5.

The encryption control unit 85 sets the coefficient according to the encryption key in the aforementioned amplifier such that encryption is performed on a readout signal from each pixel in the array sensor 2.

Meanwhile, FIG. 3 is merely an image diagram and an amplifier is not necessarily set for each pixel in the amplitude control circuit 10. For example, when readout is performed en bloc as in a charged-coupled device (CCD) image sensor, a common amplifier included in the amplitude control circuit 10 may be provided for pixels. Further, in such a case, amplitude control of respective pixels is performed in a time division manner.

Here, a readout signal of an individual pixel can be said to be a signal constituting an image signal. That is, a readout signal of an individual pixel belongs to an image signal in the sense that it constitutes a part of the image signal.

Although an example in which encryption is performed on a readout signal as an analog signal has been described above as an example of encryption for a readout signal, encryption can also be performed on a readout signal as a digital signal after A/D conversion.

Figure 4:
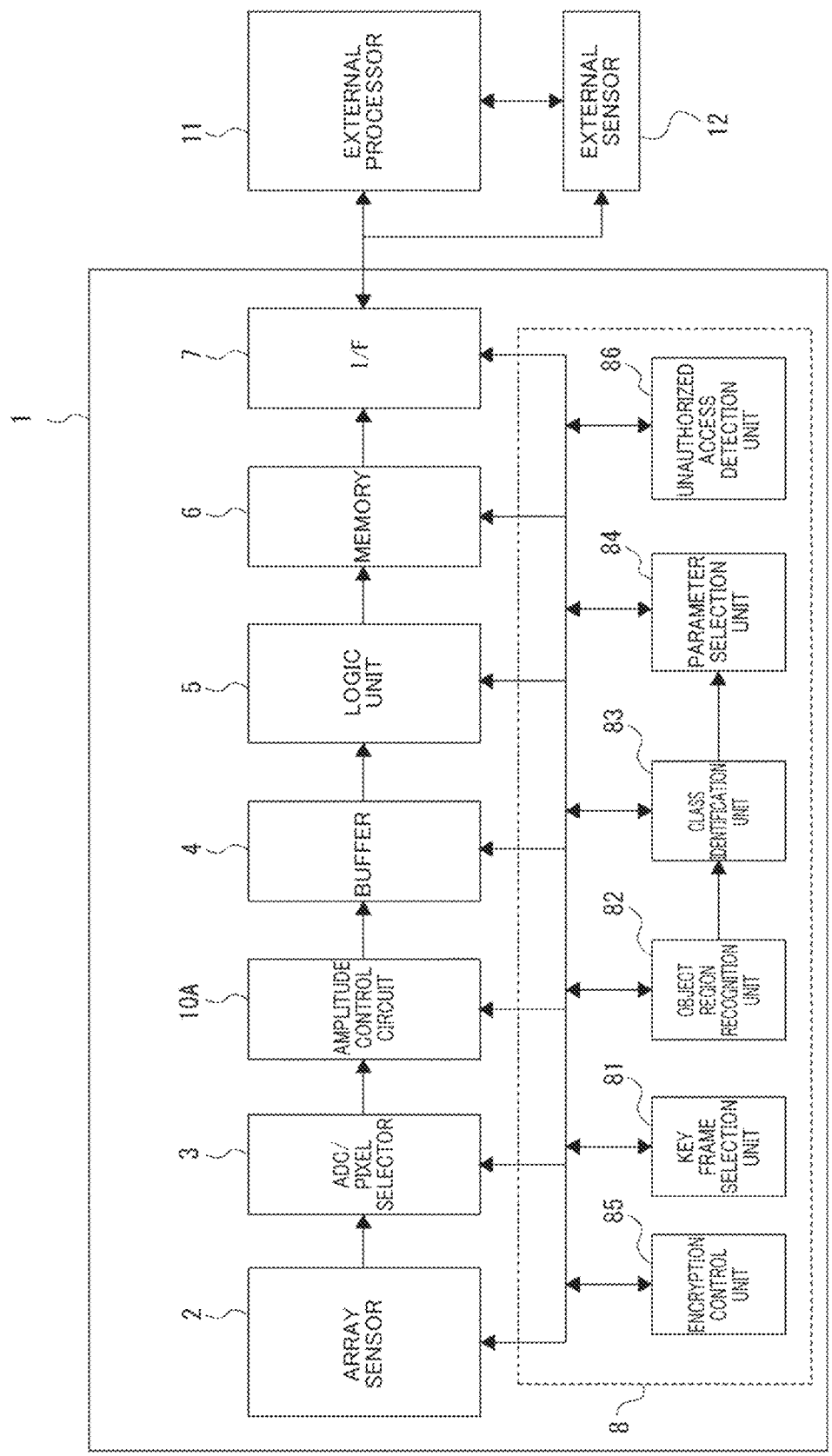
FIG. 4 is a diagram illustrating an example of a configuration of a sensor device when encryption is performed on a readout signal according to a digital signal.

FIG. 4 illustrates an example of a configuration of the sensor device 1 when encryption is performed on a readout signal as a digital signal. In this case, an amplitude control circuit 10A that performs amplitude control on a readout signal converted into a digital signal by the ADC/pixel selector 3 is provided in the sensor device 1 instead of the amplitude control circuit 10.

Meanwhile, processing performed by the encryption control unit 85 in this case is the same as that in the above-described case except that a target for which a coefficient according to an encryption key for each pixel is set is changed from the amplitude control circuit 10 to the amplitude control circuit 10A, and thus redundant description is avoided.

Here, if encryption is performed on an analog readout signal as described above, improvement of security is promoted because it is considerably difficult to illegally acquire an analog signal from the outside.

Meanwhile, when encryption is performed on an analog readout signal, there is a concern about deterioration of reproducibility of an image obtained by deciphering an encrypted image.

However, when an image that is a target is used for analysis of attributes and behaviors of a target such as a person, for example, reproducibility of the image can be obtained to a degree to which the target can be detected and analyzed and thus it is conceived that no practical problem occur.

On the other hand, when encryption is performed on a digital readout signal, the accuracy of encryption processing is enhanced and thus improvement of reproducibility of images can be promoted.

Here, encryption performed on a readout signal as described above is a kind of encryption through a stream encryption method. The stream encryption method is an encryption method of encrypting plaintext in units of predetermined data, such as in bits or in bytes.

In the stream encryption method, data lengths need not be arranged for a target signal of encryption, and thus preprocessing of encryption for the target signal is unnecessary. Accordingly, it is possible to promote increase in the speed of encryption processing by employing the stream encryption method.

[1-4. Concerning Tamper-Proofness]

Figure 5:
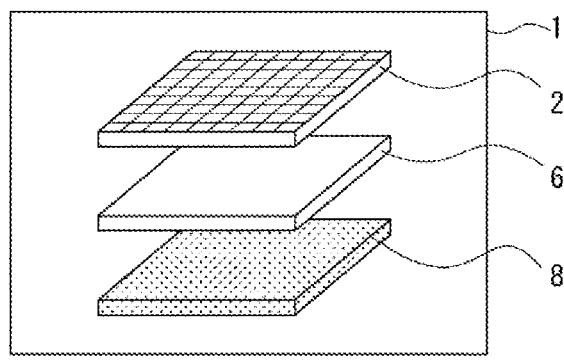
FIG. 5 is a diagram illustrating an example of a structure of a sensor device as an embodiment.

To promote tamper-proofness in terms of hardware, chips of the array sensor 2, the memory 6, and the arithmetic operation unit 8 in the sensor device 1 of the present example are packaged into a single package, as illustrated in FIG. 5. In the example of FIG. 5, a chip as the memory 6 is laminated on a chip as the arithmetic operation unit 8, and a chip as the array sensor 2 is laminated on a chip as the memory 6.

In the present example, an encryption unit that performs encryption on a readout signal is formed, for example in the chip as the array sensor 2.

In addition, the encryption control unit 85 that generates an encryption key based on photoelectric random numbers and causes the encryption unit to execute encryption based on the encryption key is included in the chip as the arithmetic operation unit 8.

In the present example, the chips are electrically connected through Cu—Cu connection by which pads made of Cu (copper) are connected, and these electrical connection parts are destroyed when decomposition of the sensor device 1 is attempted. Accordingly, tamper-proofness in terms of hardware is promoted.

Figure 6:
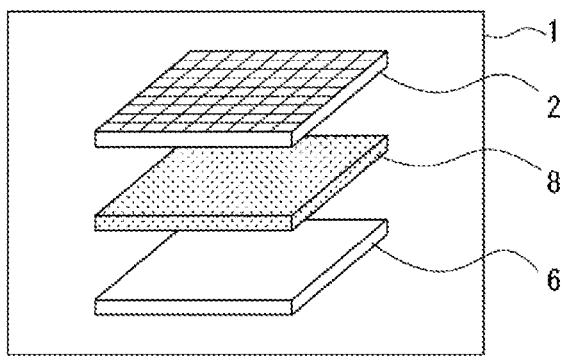
FIG. 6 is a diagram illustrating another example of a sensor device as an embodiment.

FIG. 6 illustrates another example of the structure of the sensor device 1 and differs from FIG. 5 in that vertical relationship between the arithmetic operation unit 8 and the memory 6 is changed.

Figure 7:
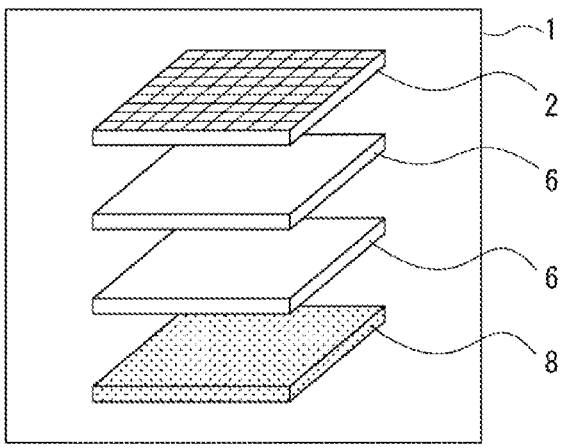
FIG. 7 is a diagram illustrating still another example of a sensor device as an embodiment.

FIG. 7 illustrates still another example of the structure of the sensor device 1 and differs from FIG. 5 in that a plurality of chips as the memory 6 are laminated (2 layers in the example of the figure).

Further, although illustration is omitted, the sensor device 1 can also be formed in a two-layer structure in which the memory 6 and the arithmetic operation unit 8 are formed on the same layer or in a 1-layer structure in which the array sensor 2, the memory 6, and the arithmetic operation unit 8 are formed on the same layer.

By employing 1-package configurations as illustrated in FIG. 5 to FIG. 7, it is possible to take measures to improve the resistance to illegal information acquisition from the memory 6 according to decomposition, such as the aforementioned Cu—Cu connection, to promote tamper-proofness in terms of hardware.

[1-5. Processing Procedure]

Subsequently, a processing procedure executed by the arithmetic operation unit 8 in order to realize encryption as the above-described first embodiment will be described with reference to a flowchart of FIG. 8.

Meanwhile, at least a part of processing which will be described below can also be realized as processing according to hardware.

Figure 8:
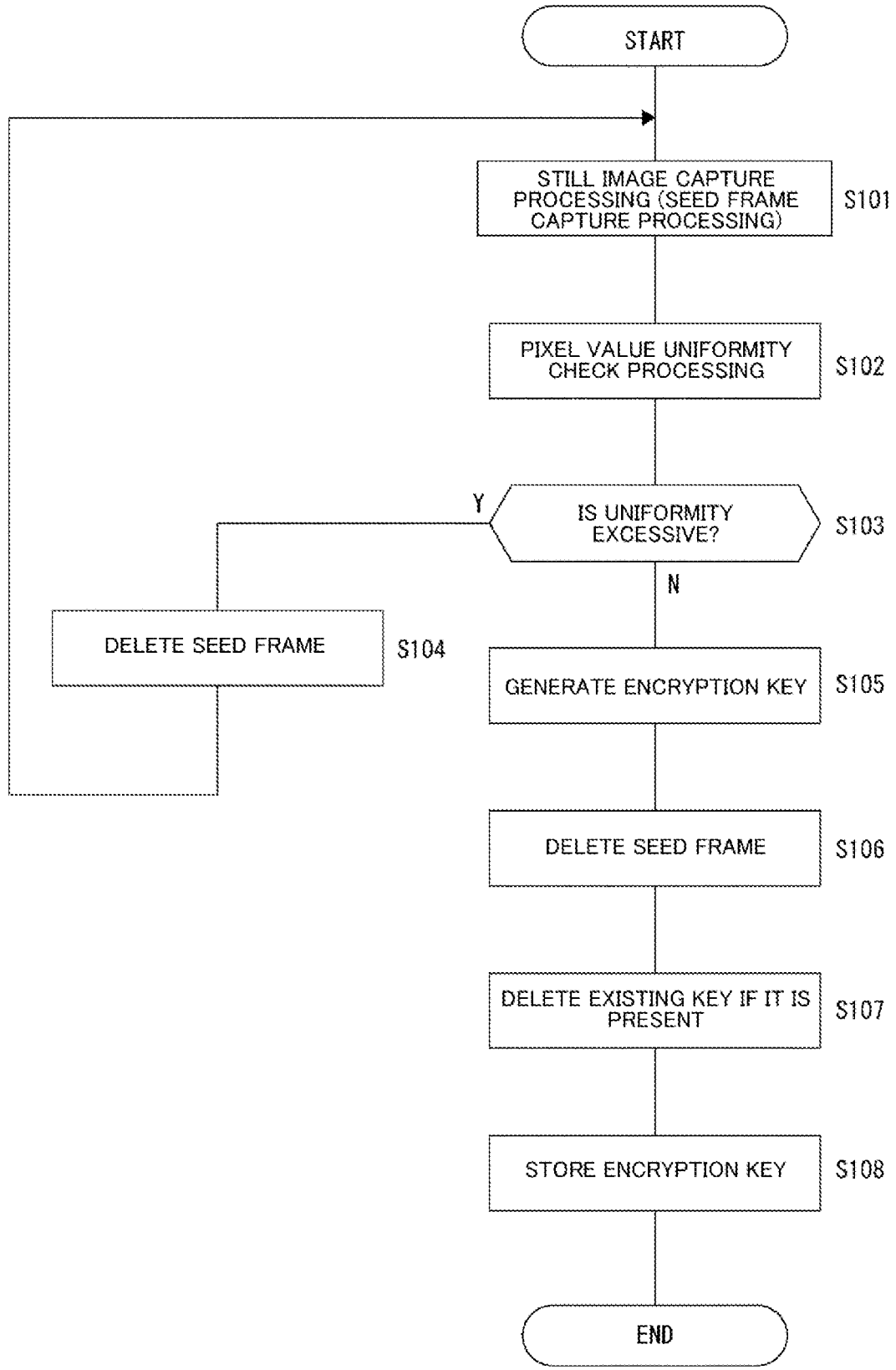
FIG. 8 is a flowchart illustrating a processing procedure executed to realize encryption as a first embodiment.

First, it is assumed that the arithmetic operation unit 8 of the present example starts processing illustrated in FIG. 8 upon startup and detection of an unauthorized access by the unauthorized access detection unit 86.

By starting processing illustrated in FIG. 8 upon detection of an unauthorized access, acquisition of photoelectric random numbers (S101) and generation of an encryption key (S105) are executed upon detection of the unauthorized access. That is, photoelectric random numbers are re-acquired upon detection of the unauthorized access and an encryption key is regenerated on the basis of the re-acquired photoelectric random numbers. Accordingly, tamper-proofness in terms of software is promoted.

Further, processing illustrated in FIG. 8 can also be started on the basis of other conditions such as starting according to an external instruction (e.g., an instruction according to an operation input) and starting at specific intervals.

In FIG. 8, the arithmetic operation unit 8 executes still image capturing processing in step S101. This still image capturing processing is processing for capturing a still image that is a source of generation of an encryption key, and the arithmetic operation unit 8 controls the array sensor 2 such that the array sensor 2 captures an image of one frame (reads out charges of respective pixels). Here, the image of one frame (still image) that is a source of generation of an encryption key is represented as a "seed frame" hereinafter. Image data as a seed frame is stored in the memory 6 upon execution of still image capturing processing of step S101.

In step S102 subsequent to step S101, the arithmetic operation unit 8 executes uniformity check processing on pixel values. This uniformity check processing is processing of checking uniformity in luminance values of pixels with respect to the seed frame and, specifically, the arithmetic operation unit 8 counts the number of pixels having a luminance value of 0 or a saturation value (maximum value).

Further, uniformity check processing using readout signal values as targets can also be executed as the pixel value uniformity check processing.

In step S103 subsequent to step S102, the arithmetic operation unit 8 determines whether the uniformity is excessive. Specifically, the arithmetic operation unit 8 determines whether the number of pixels counted in step S102 is a predetermined threshold value or more (e.g., a value corresponding to 30% to 50% of the number of valid pixels).

When determination results that the number of pixels counted in step S102 is the aforementioned threshold value or more and the uniformity is excessive have been obtained, the arithmetic operation unit 8 proceeds to step S104, executes processing of deleting the seed frame, that is, processing of deleting the image data as the seed frame stored in the memory 6, and then returns to step S101. Accordingly, it is possible to re-capture a seed frame when the randomness of pixel values of a seed frame is low. That is, it is possible to re-acquire photoelectric random numbers when the randomness of photoelectric random numbers is low.

Therefore, it is possible to prevent encryption using an encryption key based on random numbers with low randomness from being performed to promote improvement of security.

On the other hand, when determination results that the counted number of pixels is not the threshold value or more and the uniformity is not excessive are obtained in step S103, the arithmetic operation unit 8 proceeds to step S105 and generates an encryption key. Specifically, an encryption key representing a coefficient to be set in each amplifier in the amplitude control circuit 10 (or 10A) is generated on the basis of a luminance value of each pixel in the seed frame in the present example.

Here, in the present example, an encryption key is generated in a form in which at least parts of luminance values of pixels are allocated to pixel positions different from pixel positions at which the corresponding luminance values are obtained instead of being generated in a form in which luminance values of pixels are allocated as they are to pixel positions at which the luminance values are obtained in processing of step S105.

Accordingly, deciphering of the encryption key becomes difficult, and thus improvement of security can be promoted.

In step S106 subsequent to step S105, the arithmetic operation unit 8 executes processing of deleting the seed frame, that is, processing of deleting image data as the seed frame stored in the memory 6 through capturing processing of step S101.

By performing this seed frame deletion processing, it is possible to prevent leaking of the image that is a source of photoelectric random numbers and inferring of the photoelectric random numbers.

Meanwhile, in a case where the arithmetic operation unit 8 has high processing capability, a case where an image size of a seed frame is small, and the like, for example, the seed frame is not necessarily temporarily stored in the memory 6. In such a case, the arithmetic operation unit 8 (encryption control unit 85) receives photoelectric random numbers from the amplitude control circuit 10 (or 10A), for example, and generates an encryption key in step S105 through processing of step S102 and processing of step S103. In this case, deletion processing of step S106 is unnecessary (of course, deletion processing of step S104 is also unnecessary).

Subsequently, if there is an existing key, the arithmetic operation unit 8 deletes the existing key in step S107. For example, in a case where processing illustrated in FIG. 8 is started every specific time, and the like, an encryption key has been stored in the memory 6 through processing of step S108 which was performed in the past. Processing of step S107 is processing of deleting an existing encryption key when the existing encryption key has been stored in the memory 6 as described above.

By performing processing of deleting an existing key in this manner, an encryption key used for encryption in the past can be prevented from leaking and a signal encrypted in the past can be prevented from being illegally deciphered.

Subsequently, the arithmetic operation unit 8 executes processing of storing the encryption key in step S108. That is, the arithmetic operation unit 8 executes processing of storing the encryption key generated in step S105 in the memory 6. The arithmetic operation unit 8 ends a series of processes illustrated in FIG. 8 upon execution of storing processing of step S108.

In the sensor device 1, encryption is performed on an image signal obtained through imaging in the array sensor 2 using the encryption key stored in step S108. Specifically, the arithmetic operation unit 8 (encryption control unit 85) sets a coefficient of each pixel based on the stored encryption key in each amplifier in the amplitude control circuit 10 (or 10A) after end of processing illustrated in FIG. 8 such that encryption based on the stored encryption key is performed on an image signal obtained through imaging in the array sensor 2. In the present example, the array sensor 2 captures a moving image, and thus encryption according to the amplitude control circuit 10 (or 10A) is performed on each frame image constituting the moving image.

Here, as can be understood from the above description, it is assumed that encryption for an image signal is performed on the basis of photoelectric random numbers obtained in a frame period different from the image signal that is the encryption target in this example.

Accordingly, difficulty of inferring of an encryption key from an encrypted image is enhanced, and thus improvement of security can be promoted. Further, it is also possible to perform encryption of an image signal on the basis of photoelectric random numbers obtained in the same frame period as the image signal that is the encryption target.

[1-6. Concerning Information Output by Sensor Device]

Here, the arithmetic operation unit 8 can perform analysis of attributes and actions of an object that is a target, specifically in this example, an object of a class that is a target among the aforementioned classes.

For example, when an image obtained through imaging in the array sensor 2 is a monitoring image in a store, attributes of customers (persons) as targets, such as the number of persons, sexes, ages, heights, weights, presence or absence of glasses, and presence or absence of a hat, can be analyzed or actions of the customers, such as movement trajectories (moving lines) and changes in postures of the customers in the store, can be analyzed through image analysis.

Alternatively, when an image obtained through imaging in the array sensor 2 is a monitoring image of a vehicle passing through a road, attributes of the vehicle as a target, such as a vehicle model, a color, the number of passengers, and sexes of passengers, can be analyzed or actions such as a moving line on the road and a vehicle speed can be analyzed.

Figure 9:
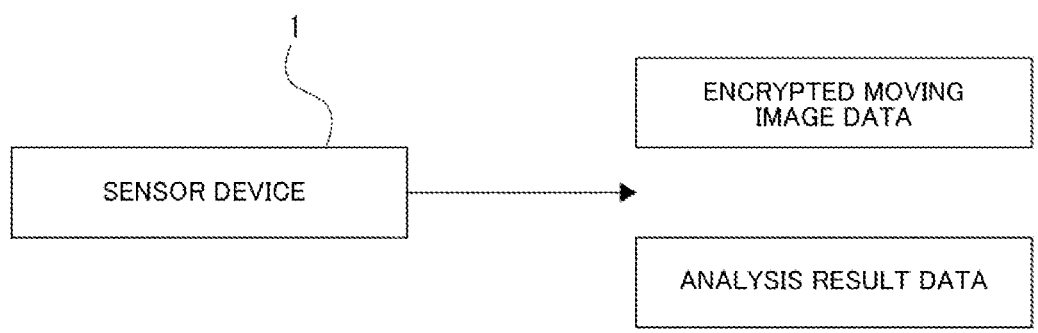
FIG. 9 is an explanatory diagram with respect to output of analysis result data in the first embodiment.

As illustrated in FIG. 9, the sensor device 1 can employ a configuration in which moving image data on which encryption has been performed ("encrypted moving image data" in the figure) as the above-described embodiment and data representing results of the aforementioned analysis ("analysis result data" in the figure) are output to the external processor 11.

Here, the interface 7 can output the analysis result data as metadata of the encrypted moving image data. Alternatively, the interface 7 can output the analysis result data independently of the encrypted moving image data. In addition, a configuration in which the external processor 11, for example, indicates necessary information to the interface 7 and the interface 7 outputs the information in response to the indication with respect to the analysis result data may be conceived.

Here, since encryption is performed at the point in time of a readout signal in the encryption method of the present example, the arithmetic operation unit 8 needs to decipher an encrypted image signal in order to perform object detection and the aforementioned analysis. In the present example, the arithmetic operation unit 8 performs object detection and analysis processing while deciphering encrypted image data stored in the memory 6 through an on-the-fly method. The on-the-fly method is a method of processing encrypted data while deciphering it in bytes or in words.

Accordingly, it is possible to reduce a likelihood of leaking of an image signal in a plaintext state when object detection from an image or analysis of a detected object is performed to promote improvement of security.

[1-7. Concerning Transfer of Key]

Figure 10:
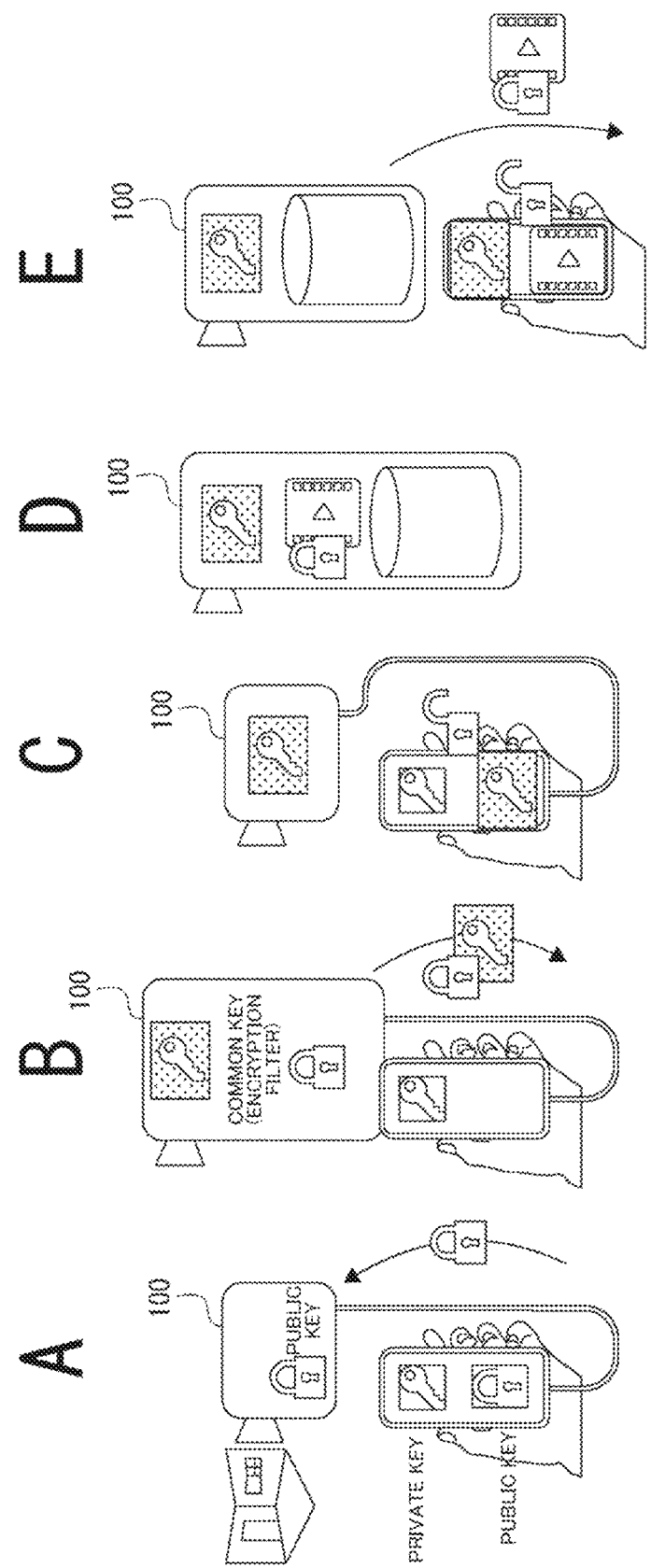
FIG. 10 is a diagram for describing an example of a method for securely transferring a key for deciphering to an image receiving side.

An example of a method for securely transferring a key for deciphering to an image receiving side will be described with reference to FIG. 10. This method is a method of transferring a common key using public key encryption. First, the image receiving side creates a public key and a private key and transfers the public key to a camera apparatus 100 including the sensor device 1 (FIG. 10A).

The camera apparatus 100 that has acquired the public key uses an encryption key generated on the basis of photoelectric random numbers as described above as a common key, encrypts the common key according to the public key, and transmits the encrypted common key to the image receiving side (FIG. 10B). Then, the image receiving side deciphers the transmitted common key (deciphering key) using the private key created in FIG. 10A (FIG. 10C). Accordingly, the image receiving side can rapidly decipher encrypted moving image data received from the camera apparatus 100 using the deciphered common key thereafter. FIG. 10D schematically represents that the camera apparatus 100 performs image encryption using the common key and FIG. 10E schematically represents that the image receiving side deciphers image data encrypted according to the common key using the common key. Meanwhile, although a time of about several seconds is required for each of encryption of the common key according to the public key in FIG. 10B and deciphering of the common key according to the private key in FIG. 10C, such encryption and deciphering are necessary only once per transfer of one key.

2. Second Embodiment

[2-1. Encryption Method of Second Embodiment]

Subsequently, an encryption method as the second embodiment will be described. Meanwhile, the same parts as parts that have already been described are denoted by the same signs and description thereof is omitted in the following description. Even in the second embodiment, the configuration of the sensor device 1 is the same as that illustrated in FIG. 1 and thus redundant description is avoided.

In the second embodiment, encryption for a target area in an image signal is performed.

Specifically, in the second embodiment, a concealing level of information is changed stepwise depending on deciphering keys caused to be held by an image receiving side by performing encryption based on encryption keys that are different in an entire image and a target area and performing encryption based on encryption keys that are different in an area of a specific part and other areas with respect to the target area.

FIG. 11 and FIG. 12 are diagrams for describing images of stepwise encryption in the second embodiment.

FIG. 11 illustrates images of stepwise encryption in a case where a target class is a person.

FIG. 11A illustrates an image before encryption. In this case, a target area AT is the whole area of a part in which a person is reflected in the image. Further, a specific area AS that is an area of a specific part is an area of the face of the person in this case.

FIG. 11B illustrates an image in which only the specific area AS has been encrypted, FIG. 11C illustrates an image in which only the target area AT including the specific area AS has been encrypted, and FIG. 11D illustrates an image in which the whole area has been encrypted.

FIG. 12 illustrates images of stepwise encryption in a case where a target class is a vehicle, and FIG. 12A illustrates an image before encryption.

In this case, a target area AT is the whole area of a part in which the vehicle is reflected in the image, and specific areas AS are areas of a passenger of the vehicle and a number plate.

FIG. 12B is an image in which only the specific areas AS have been encrypted, FIG. 12C is an image in which only the target area AT including the specific areas AS has been encrypted, and FIG. 12D is an image in which the whole area of the image has been encrypted.

Here, the image before encryption illustrated in FIG. 12A is personal information by which an individual can be identified because both the passenger and the number plate are represented. Accordingly, it is not suitable to be used for marketing data and the like.

In the case of the image in which only the specific areas AS have been encrypted, illustrated in FIG. 12B, it is possible to determine a vehicle model and the number of vehicles, for example, for marketing of a vehicle manufacturer without acquiring information by which an individual can be identified, such as passengers including a driver and the number plate. In the case of the image in which only the target area AT has been encrypted, illustrated in FIG. 12C, it is possible to acquire only the number of vehicles and information on movement without acquiring personal information and vehicle model information. For example, a congestion state can be determined.

In the case of the examples of FIG. 11 and FIG. 12, at least three types of encryption keys, a first encryption key corresponding to encryption of the whole area of the image, a second encryption key corresponding to encryption of only the target area AT, and a third encryption key corresponding to encryption of only specific areas AS, are generated as encryption keys.

Figure 13:
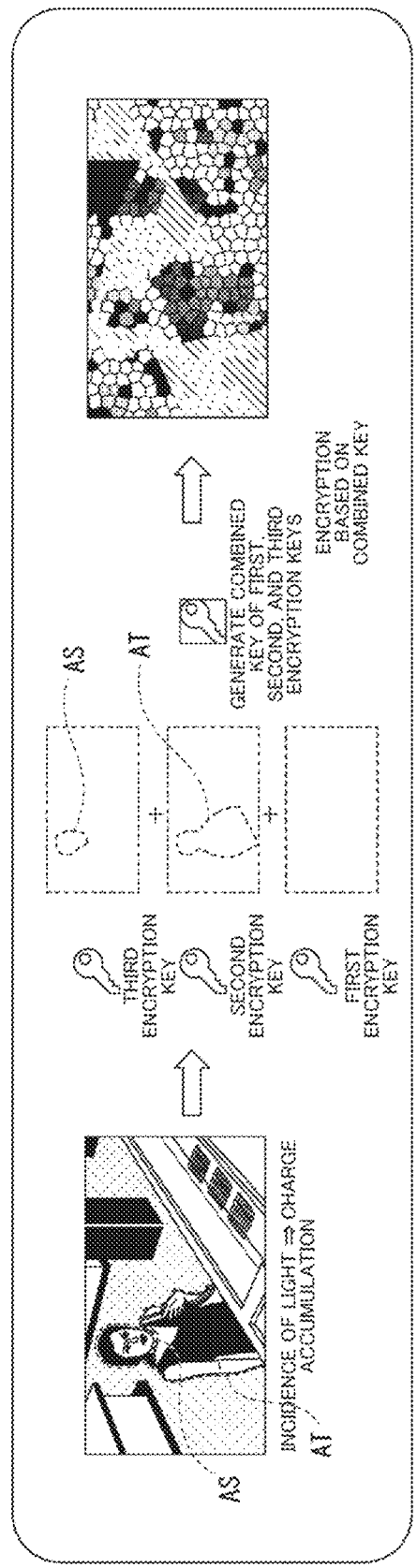
FIG. 13 is a diagram for describing an example of a specific method of stepwise encryption.

FIG. 13 is a diagram for describing an example of a specific method of stepwise encryption.

In the present example, encryptions based on the first, second, and third encryption keys are not individually performed on a target image, and encryption is performed on the target image on the basis of a combined key obtained by combining the plurality of encryption keys.

First, the third encryption key for encrypting the specific area AT, the second encryption key for encrypting the whole target area AT, and the first encryption key for encrypting the whole area of the image are prepared. Although three types of photoelectric random numbers may be obtained (i.e., three types of seed frames are captured) in generation of the three types of encryption keys, the three types of encryption keys are generated from common photoelectric random numbers in order to reduce a time required to generate encryption keys in the present example. Specifically, in the present example, first, three types of random numbers (hereinafter represented as first random numbers, second random numbers, and third random numbers) in which arrangement of numerical values of pixels in common photoelectric random numbers are different are generated in generation of the three types of encryption keys. Then, an encryption key obtained by extracting numeral values of pixels of the specific area AS from numeral values of the third random numbers is generated as the third encryption key.

In addition, an encryption key obtained by extracting numeral values of pixels of the target area AT from numeral values of the second random numbers is generated as the second encryption key.

An encryption key to which the first random numbers are applied as they are is generated as the first encryption key.

In addition, an encryption key obtained by combining the first, second, and third encryption keys is generated as a combined key, as illustrated. Then, encryption of the target image is performed on the basis of the combined key.

It is possible to change a concealing level of information according to a deciphering key held by the image receiving side by performing stepwise encryption as described above.

Figure 14:
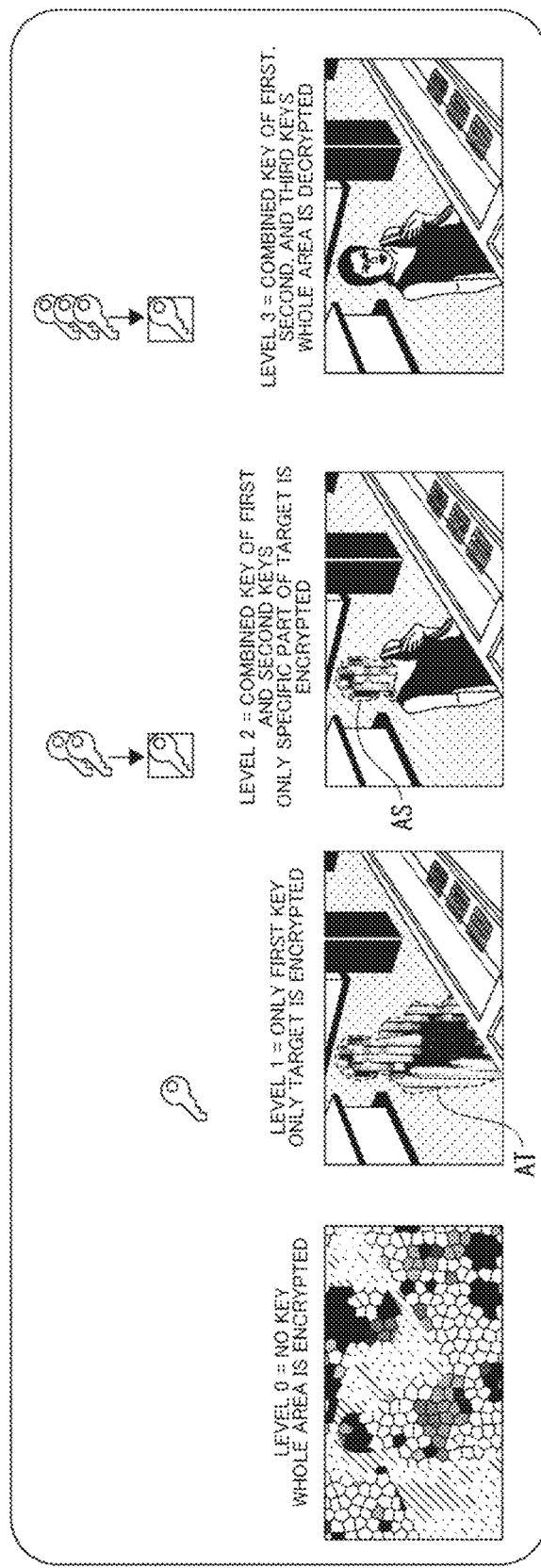
FIG. 14 is an explanatory diagram with respect to an example of concealing level change.

FIG. 14 is an explanatory diagram of an example of concealing level change. Here, four levels from level 0 to level 3 are defined as levels with respect to holding of a key. As illustrated, level 0 means absence of a key, level 1 means holding of only the first encryption key, level 2 means holding of a combined key of the first and second encryption keys, and level 3 means holding of a combined key of the first, second, and third encryption keys.

In the case of level 0, an encrypted image cannot be deciphered and an image in which the whole area has been encrypted is obtained in the image receiving side. In the case of level 1, an area other than the target area AT can be deciphered using the first encryption key, and thus an image in which only the target area AT has been encrypted is obtained in the image receiving side.

In the case of level 2, an area other than the specific area AS can be deciphered using the combined key of the first and second encryption keys, and thus an image in which only the specific area AS in the target has been encrypted is obtained in the image receiving side.

In the case of level 3, the whole area of the image can be deciphered using the combined key of the first, second, and third encryption keys in the image receiving side and, in this case, an image without concealment of information can be obtained.

Here, an object as a target reflected in an image has a possibility of being displaced in the image with the elapse of time because an image that is an encryption target is a moving image in the present example. Accordingly, when encryption is performed for the aforementioned target area AT, it is necessary to track the target.

Hereinafter, an example of a specific method of encryption as the second embodiment including such target tracking will be described with reference to FIG. 15.

Figure 15:
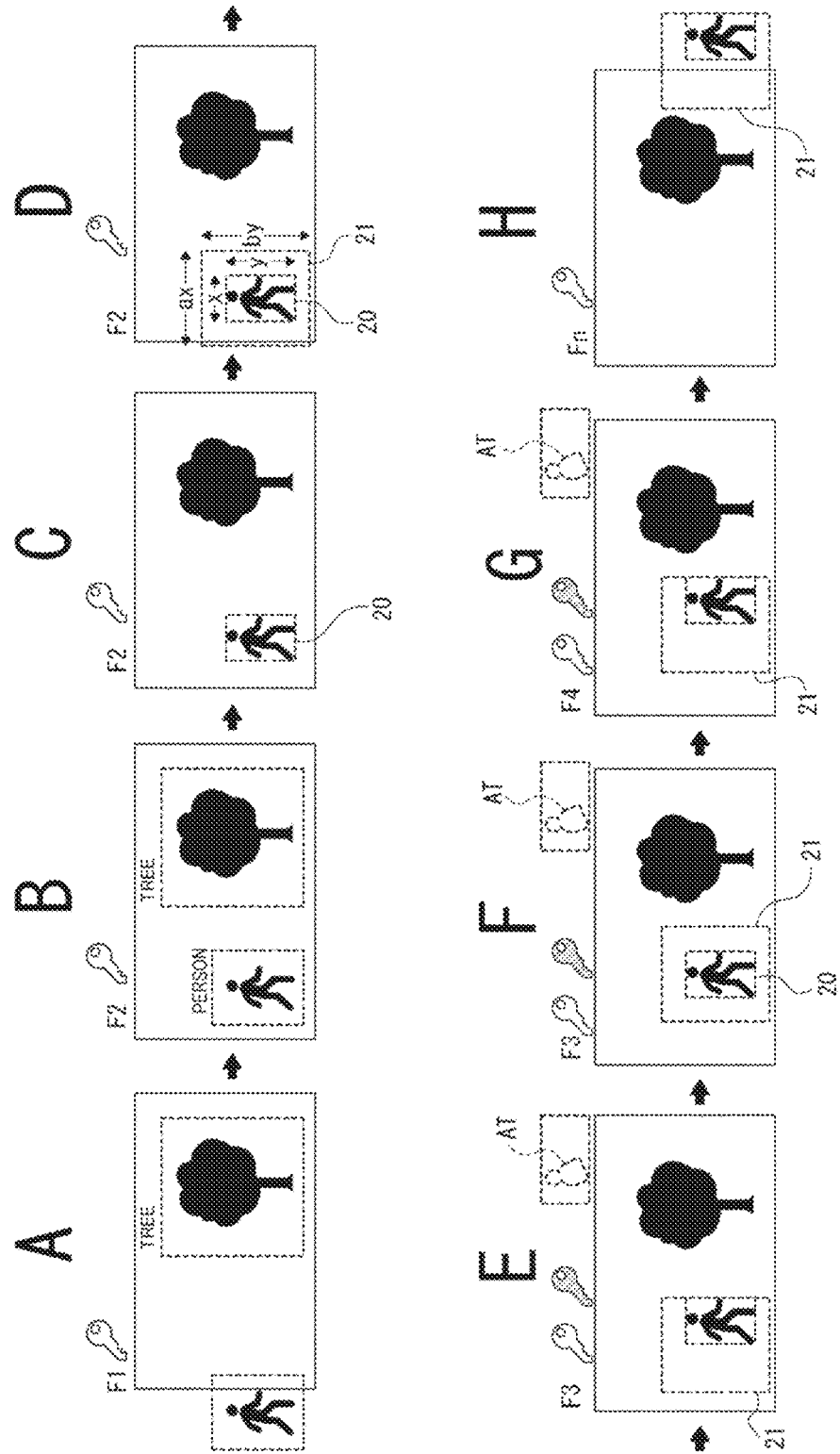
FIG. 15 is a diagram for describing an example of a specific method of encryption as a second embodiment.

Meanwhile, a target class is assumed to be "person" in FIG. 15. In addition, in FIG. 15, an example in which a specific area AC and other areas in a target area AT are not discriminated from each other and encryption is separately performed only on the target area AT and other areas in an image is given for convenience of description.

First, a frame F1 shown in FIG. 15A represents a state in which a person that is a target class does not frame in yet. Further, an example in which an object as a "tree" that is not the target class is identified in the image is illustrated here.

Here, encryption for the whole area of an image is performed irrespective of presence or absence of a target. That is, an image of each frame F is encrypted in the amplitude control circuit 10 (or 10A) on the basis of the first encryption key corresponding to the whole area of the image and then stored in the memory 6. An outlined key mark shown in each diagram of FIG. 15 represents that encryption is performed for the whole area of such an image as an output image.

For target tracking, the arithmetic operation unit 8 performs detection of an object region in an image and class identification (processing of the above-described object region recognition unit 82 and the class identification unit 83). To perform such processing, the arithmetic operation unit 8 deciphers a frame image encrypted and stored as described above. That is, the arithmetic operation unit 8 executes processing for target tracking while deciphering a frame image encrypted on the basis of the first encryption key. The arithmetic operation unit 8 performs this deciphering through the on-the-fly method. Accordingly, a likelihood of leaking of an image signal in a plaintext state during target tracking can be reduced, and thus improvement of security can be promoted.

A frame F2 shown in FIG. 15B represents a frame-in state of the "person" that is the target class. In this state, the "person" that is the target class is identified along with the "tree" that has already been identified.

When the object as the target class has been identified in this manner, the arithmetic operation unit 8 (object region recognition unit 82) calculates a bounding box 20 at accurate position coordinates which surrounds the area of the object.

For example, FIG. 15C illustrates an example of the bounding box 20 with respect to an image of the person that is the target class. That is, the bounding box 20 is calculated as a more accurate region of the object corresponding to the target class.

Further, the arithmetic operation unit 8 (object region recognition unit 82) calculates an ROI 21 that is a region of interest based on the bounding box 20.

FIG. 15D shows the ROI 21 and the bounding box 20. The ROI 21 is calculated, for example, by enlarging (ax×by) the longitudinal and lateral sizes (x×y) of the bounding box 20. Although scales a and b of enlargement can be set longitudinally and laterally and an enlargement ratio may be fixed, designation from outside of the sensor device 1 (e.g., by the external processor 11 or the like) may be conceived.

In the present example, this ROI 21 is used as a target area AT and encryption using an encryption key different from that for the whole area of the image is performed thereon.

Here, the frame F2 is a frame in which the target class is newly identified in the image and thus it can be referred to as a target class discovery frame. In the present example, encryption based on the second encryption key cannot be performed on the ROI 21 with respect to the target class discovery frame because the method of performing encryption on readout signals from pixels is employed. Encryption based on only the first encryption key has already been performed on the target class discovery frame and the encrypted target class discovery frame has been stored in the memory 6. When the target class discovery frame on which encryption based on only the first encryption key has been performed in this manner is output as it is, an image area of the ROI 21 is disclosed to a holder having only the first encryption key without being concealed.

Accordingly, in the present example, it is assumed that the target class discovery frame is deleted from the memory 6, and an appropriate information concealing level according to a deciphering key held by an image receiving side is realized.

FIG. 15E shows a frame F3 that is a next frame of the frame F2. Encryption based on the second encryption key is performed for the ROI 21 from the next frame F of the target class discovery frame. The ROI 21 here is the ROI 21 calculated at the point in time of the frame F2 that is the target class discovery frame.

When the "person" that is the target class is moving, in the frame F3, the person further proceeds in a movement direction than in the frame F2, but the person as the target class is within the ROI 21 in the frame F3 because the ROI 21 has a range larger than the bounding box 20. That is, the person as the target class is within a target range of encryption based on the second encryption key.

After the frame F3, the bounding box 20 and the ROI 21 with respect to the target class are calculated in the same manner such that the target class is tracked (refer to FIG. 15F). Then, after a frame F4, encryption based on the second encryption key is performed for the ROI 21 calculated in the previous frame F as in the frame F3 (refer to FIG. 15G).

FIG. 15H shows a frame Fn after frame out of the "person" as the target class. Due to frame out of the target class, the ROI 21 is not calculated. Accordingly, encryption based on only the first encryption key is performed on the image of the frame Fn.

Meanwhile, although an example in which a rectangular area obtained by enlarging the bounding box 20 is used as the ROI 21 has been described above, the ROI 21 is not limited to the rectangular area.

For example, the ROI 21 may be calculated from the area of the object of the target class using semantic segmentation, that is, object area detection at a pixel level.

Figure 16:
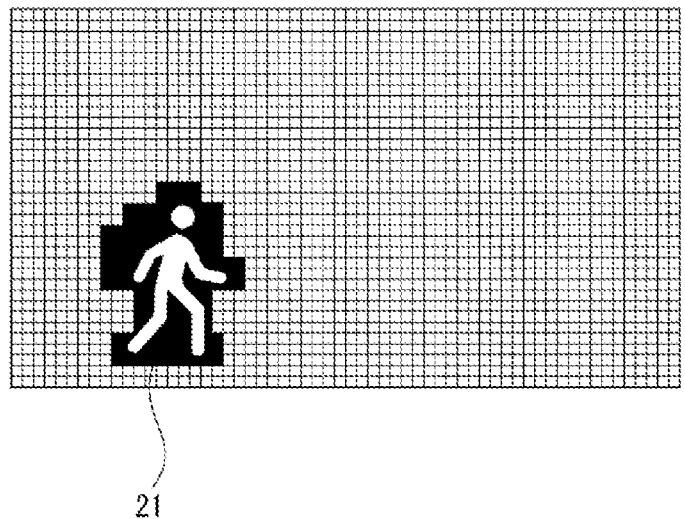
FIG. 16 is a diagram for describing a modified example of an ROI in the second embodiment.

FIG. 16 illustrates an ROI 21 based on semantic segmentation. This is an example in which a nonrectangular ROI 21 is set by enlarging a pixel region as an object (e.g., a person).

For example, in the case of a truck with a protrusion, a person riding a bicycle, or the like, a part thereof may not be included in the rectangular ROI 21 or may become an excessively large state. If the nonrectangular ROI 21 is generated in response to an object position at a pixel level, it is possible to appropriately set a concealing region with respect to a target.

[2-2. Processing Procedure]

A processing procedure executed by the arithmetic operation unit 8 in order to realize encryption as the above-described second embodiment will be described with reference to the flowcharts of FIG. 17 and FIG. 18.

Figure 17:
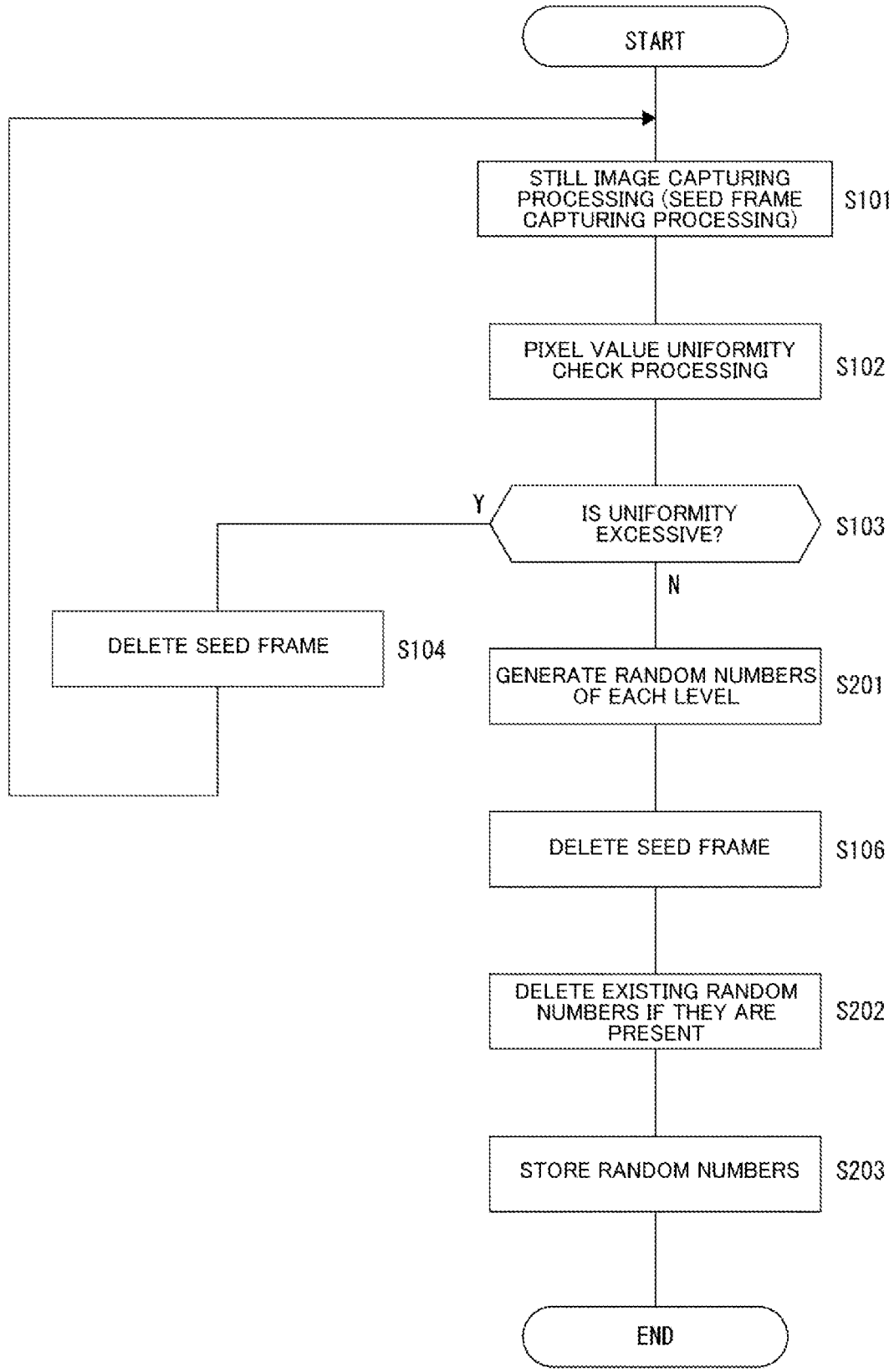
FIG. 17 is a flowchart illustrating processing corresponding to a step of capturing a seed frame to a step of storing random numbers that become a source of an encryption key in the second embodiment.

FIG. 17 illustrates processing corresponding to a step of capturing a seed frame to a step of storing random numbers that become a source of an encryption key. Meanwhile, in FIG. 17, the same processing as processing that has already been described in FIG. 8 is denoted by the same step number and description thereof is omitted.

Like the processing of FIG. 8, processing of FIG. 17 is started upon startup and detection of an unauthorized access by the unauthorized access detection unit 86. Alternatively, the processing can also be started on the basis of other conditions such as starting at specific intervals.

Figure 18:
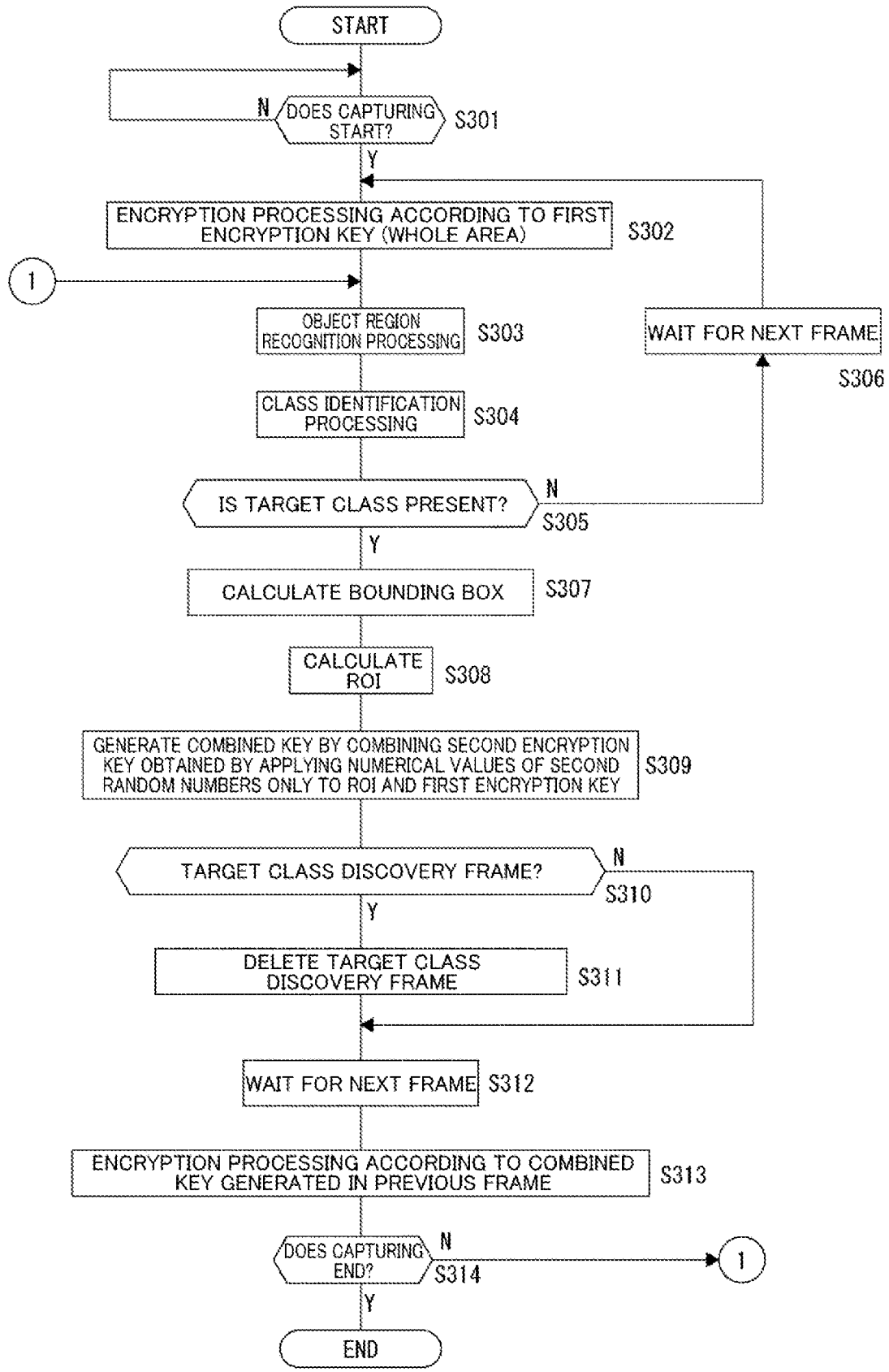
FIG. 18 is a flowchart illustrating processing for encrypting a target image on the basis of a generated encryption key in the second embodiment.

Further, at least parts of the processing described in FIG. 17 and FIG. 18 can also be realized as hardware processing.

In FIG. 17, the arithmetic operation unit 8 in this case proceeds to step S201 and generates random numbers of each level when it is determined that uniformity is excessive in step S103. Here, two types of the aforementioned first random numbers and the second random numbers are generated as the random numbers because the specific area AS in the target area AT is not distinguished. Meanwhile, since the method of generating various random numbers on the basis of photoelectric random numbers of a seed frame has already been described, redundant description is avoided.

In this case, the arithmetic operation unit 8 executes processing of deleting the seed frame in step S106 upon execution of processing of generating the random numbers in step S201.

Then, the arithmetic operation unit 8 executes processing of deleting existing random numbers if they are present in step S202 upon execution of deletion processing of step S106. That is, if random numbers (the first random numbers and the second random numbers) of each level stored in the memory 6 through processing of step S203 which was executed in the past are present, the random numbers are deleted.

In step S203 subsequent to step S202, the arithmetic operation unit 8 performs processing of storing the random numbers of each level generated in step S201 in the memory 6 and ends the series of processes shown in FIG. 17.

FIG. 18 illustrates processing for encrypting a target image on the basis of generated encryption keys.

First, the arithmetic operation unit 8 waits for starting of capturing of an image that is an encryption target in step S301 and executes encryption processing according to the first encryption key in step S302 when capturing starts. That is, the arithmetic operation unit 8 indicates a coefficient of each pixel based on the first encryption key to the amplitude control circuit 10 (or 10A) to cause the amplitude control circuit 10 (or 10A) to execute encryption for readout signals of the array sensor 2. As can be understood from the above description, the first encryption key is an encryption key to which the first random numbers have been applied as they are in the present example.

The arithmetic operation unit 8 executes object region recognition processing in step S303 subsequent to step S302 and executes class identification processing in subsequent step S304. The object region recognition processing of step S303 is the above-described processing of the object region recognition unit 82 and performs detection of an object that is a candidate from an image of a current frame and processing of recognizing the object region. In addition, the class identification processing of step S304 is the above-described processing of the class identification unit 83 and performs class identification with respect to the object detected through the aforementioned object region recognition processing. When a plurality of objects or a plurality of types of objects have been detected, class identification is performed on each object and each object is classified as each class. In the case of FIG. 15B, for example, class identification and classification are performed such that there are one object as a class of "tree" and one object as a class of "person."

Further, the arithmetic operation unit 8 executes processing of steps S303 and S304 while deciphering a frame image encrypted in step S302 or step S313 which will be described later through the on-the-fly method.

In step S305 subsequent to step S304, the arithmetic operation unit 8 determines whether a target class is present. That is, the arithmetic operation unit 8 determines whether a target class is present among classes identified in step S304.

If a target class is not present, the arithmetic operation unit 8 waits for the next frame in step S306 (waits for arrival of the next frame period) and then returns to step S302. That is, the processing of encrypting the whole area of the image in step S302, the object region recognition processing of step S303, and the class identification processing of step S304 are repeatedly executed for each frame until a target class is detected.

When it is determined that a target class is present in step S305, the arithmetic operation unit 8 proceeds to step S307, calculates a bounding box 20, and subsequently calculates an ROI 21 in step S308.

Further, the arithmetic operation unit 8 generates a combined key by combining the second encryption key obtained by applying the numeral values of the second random numbers only to the ROI 21 and the first encryption key in subsequent step S309.

The arithmetic operation unit 8 determines whether a current frame is a target class discovery frame in step S310 upon generation of the combined key in step S309. If the current frame is a target class discovery frame, the arithmetic operation unit 8 executes processing of deleting the target class discovery frame in step S311. Accordingly, with respect to the target class discovery frame, unconcealing of a target image part is prevented irrespective of the key holding level corresponding to level 1.

If the current frame is not a target class discovery frame in step S310, the arithmetic operation unit 8 skips the deletion processing of step S311 and performs processing of waiting for the next frame in step S312. In addition, the arithmetic operation unit 8 also performs processing of waiting for the next frame in step S312 when the deletion processing of step S311 has been executed.

The arithmetic operation unit 8 executes encryption processing according to the combined key generated in the previous frame in step S313 upon execution of the waiting processing of step S312. That is, the arithmetic operation unit 8 indicates a coefficient of each pixel based on the combined key to the amplitude control circuit 10 (or 10A) to cause the amplitude control circuit 10 (or 10A) to execute encryption for readout signals of the array sensor 2.

In step S314 subsequent to step S313, the arithmetic operation unit 8 determines whether capturing ends, that is, whether capturing of the image that is the encryption target needs to end, for example, according to a capturing end instruction from the outside, or the like.

If capturing does not end, the arithmetic operation unit 8 returns to step S303. Accordingly, processing described so far is repeated until capturing ends. That is, if a successive target class is present, calculation of an ROI with respect to the target class, generation of a combined key based on the calculated ROI, and encryption processing based on a combined key generated in a previous frame are performed, and when a target class is not present, encryption processing according to a combined key is not performed and encryption processing according to the first encryption key is executed.

If capturing ends, the arithmetic operation unit 8 ends the series of processes shown in FIG. 18.

Meanwhile, although the ROI 21 is set as a region obtained by enlarging the bounding box 20 such that it can include an object as a target in the next frame in the present example, it is also conceived that the scales a and b of enlargement when the longitudinal and lateral sizes (x×y) are enlarged (ax×by) depend on a frame rate.

For example, when the frame rate is low, a time of a frame spacing increases and a movement amount of an object such as a person also increases, and thus it may be conceived that the ROI 21 be enlarged more than that in a case where the frame rate is high.

Further, when a specific part and other regions in the target area AT are discriminated from each other and encryption is performed thereon, a bounding box 20 and an ROI 21 are calculated for the specific part through the same method as the above-described method, and a third encryption key obtained by applying numerical values of third random numbers to the calculated ROI 21 is generated. Then, a combined key obtained by combining the first, second, and third encryption keys may be generated and used for encryption of the image of the next frame.

[2-3. Example of Output of Analysis Information]

Further, the sensor device 1 can be configured to output analysis result data along with encrypted moving image data to the outside even in the second embodiment (refer to FIG. 9).

Figure 19:
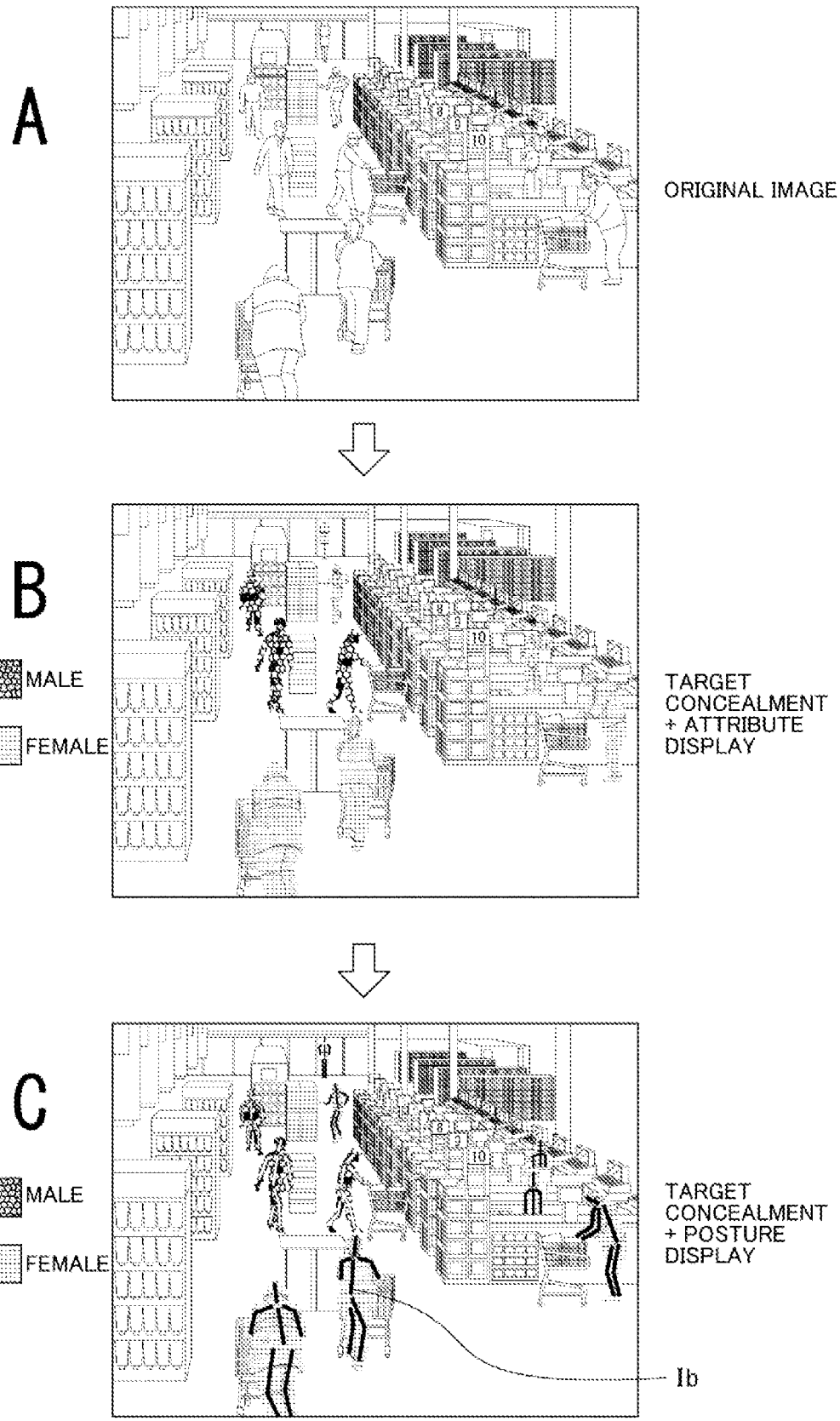
FIG. 19 is an explanatory diagram with respect to output of analysis result data in the second embodiment.

Here, since encryption is performed for the target area AT in the second embodiment, analysis result data is not limited to text data and may be data that can be displayed as an image, as illustrated in FIG. 19, for example.

In FIG. 19, FIG. 19A shows an original image before encryption.

FIG. 19B shows an example in which attribute information analyzed with respect to targets (here "persons') is displayed on an image and displays sex information of the targets in a distinguishing manner using colors of target areas in an encrypted state.

Further, FIG. 19C shows an example in which posture information Ib obtained through target analysis processing is superposed and displayed on target areas in an encrypted state.

By performing encryption for a target area in this manner, it is possible to provide an image from which analysis results with respect to attributes and actions of a target can be ascertained more easily while guaranteeing concealment of personal information.

Recently, the number of cases in which video captured by a camera in a store is used as marketing data has increased. In such a case, it is not necessary to identify individuals of customers who come to the store and analysis of attributes and actions of the customers, and the like become necessary information. The image of FIG. 19A as it is data by which individuals can be identified and high-concealing information, and thus a system with a high security measure is required therefor, which increase a cost. The image shown in FIG. 19B is useful as marketing data because moving lines of customers in the store and attributes of males and females can be ascertained. The image shown in FIG. 19C can be used as valuable marketing data because postures of customers can be additionally recognized and thus a customer's action of holding products with hands or trying on clothes but not purchasing them can also be determined. The image of FIG. 19B and the image of FIG. 19C have the merit of being operated by a system with a low-cost security measure as compared to the image of FIG. 19A because individuals cannot be identified from either of them. In addition, since a camera equipped with the sensor device 1 as an embodiment is used, plaintext data is not present even when malware has been installed in the camera in the store, and thus the effect of no hacking risk is obtained.

<3. Modified Examples>

Meanwhile, embodiments are not limited to the specific examples described so far and various modified examples may be conceived.

Although not particularly mentioned above, for example, on the assumption that an array sensor including color filters in the Bayer layout or the like, for example, is used as the array sensor 2, the present technology can also be suitably applied to a case in which a color image is obtained as a captured image. When the array sensor 2 including color filters is used, a predetermined plurality of number of pixels including, for example, length×width=a plurality of pixels×a plurality of pixels, are assumed to be a single color unit, and pixel values are combined to obtain color signal values such as RGB values for each color unit. For example, when the Bayer layout is employed, length×width=2×2=4 pixels in which RGGB color filters are formed become a single color unit, and pixel values (luminance values) of RGGB are combined to obtain a set of RGB values for each color unit.

When the array sensor 2 including color filters is used, it is also possible to generate an encryption key to which random numbers have been allocated in units of the aforementioned color unit as an encryption key for image encryption.

Figure 20:
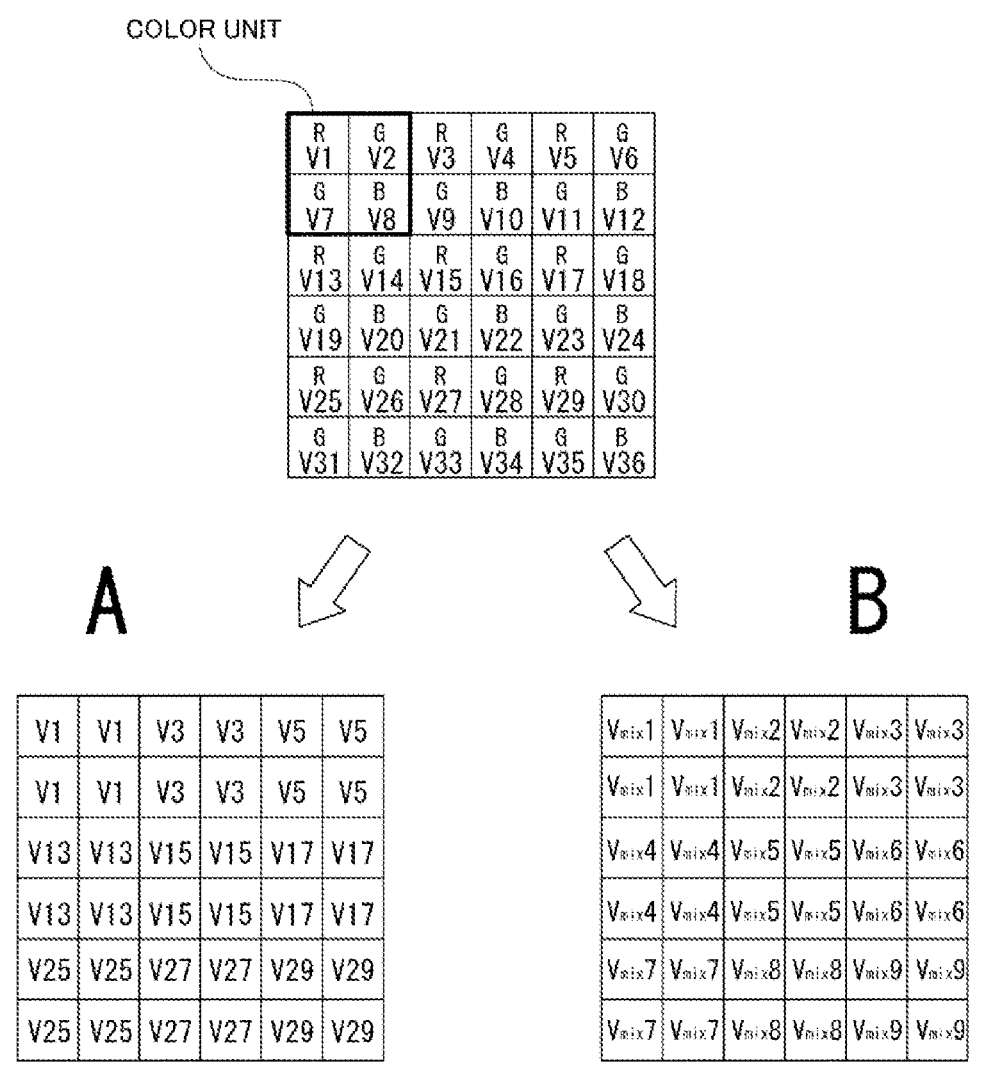

FIG. 20 is an explanatory diagram with respect to examples of generation of an encryption key to which random number values have been allocated in units of a color unit.

In an example of FIG. 20A, a luminance value of a single pixel in a color unit is allocated as a random number value of each pixel in the unit. Specifically, in the example in the figure, a luminance value of a left top pixel in a unit is allocated as a random number value of each pixel in the unit for each color unit.

In an example of FIG. 20B, a value calculated through a predetermined arithmetic operation using luminance values of pixels in a unit is allocated as a random number value of each pixel for each color unit. As a specific example, allocation of an average value of luminance values of pixels in a unit as a random number value of each pixel in the unit for each color unit is conceivable. That is, in the case of a left top color unit in the figure, Vmix1=(V1+V2+V7+V8)/4. Here, an arithmetic operation using luminance values of all pixels in a unit is not necessarily employed, and an arithmetic operation using only luminance values of some pixels can also be employed. For example, Vmix1=(V1+V7)/2, and the like may be used. In addition, an averaged value is not necessarily used for each unit. For example, allocation of the sum of luminance values of pixels, such as Vmix1=V1+V2+V7+V8, to each unit may be conceived. By generating an encryption key to which random number values have been allocated in units of a color unit as described above, it is possible to promote reduction in a processing load as compared to a case in which a random number value is allocated to each pixel.

In addition, although an example in which an image signal is used as an encryption target signal in encryption using photoelectric random numbers has been described above, an encryption target signal is not limited to the image signal.

Furthermore, although examples in which photoelectric random numbers are used for encryption with respect to the method of performing encryption on readout signals from pixels of the array sensor 2 and the method of performing encryption for a target area have been described above, random numbers used for encryption are not limited to the photoelectric random numbers with respect to these methods. For example, pseudo-random numbers can also be used. Alternatively, if true random numbers are used, a method of detecting a natural phenomenon that cannot be substantially predicted or reproduced, for example, change in heat or sound, or the like, using a corresponding sensor and generating random numbers on the basis of the detected values can be employed.

<4. Summary of Embodiments>

As described above, an encryption device (sensor device 1) of an embodiment includes an encryption key generation unit (encryption control unit 85) that generates an encryption key on the basis of photoelectric random numbers that are random numbers obtained on the basis of photoelectric conversion performed by an array sensor (array sensor 2) in which a plurality of pixels having light-receiving elements for visible light or non-visible light are one-dimensionally or two-dimensionally arranged, and an encryption unit (amplitude control circuit 10 or 10A) that performs encryption of a target signal on the basis of the encryption key generated by the encryption key generation unit, as described in the first embodiment.

Accordingly, it is possible to realize encryption that makes deciphering of an encryption key more difficult as compared to a case in which pseudo-random numbers are used.

Therefore, it is possible to promote improvement of security.

In addition, in the encryption device as the embodiment, the encryption key generation unit generates the encryption key by acquiring values of electrical signals of the pixels, obtained through the photoelectric conversion, as the photoelectric random numbers.

Accordingly, it is possible to generate an encryption key that is difficult to decipher.

Therefore, it is possible to promote improvement of security.

Further, in the encryption device as the embodiment, the encryption unit performs encryption based on the encryption key on an image signal obtained through imaging in the array sensor.

Accordingly, it is possible to perform encryption on an image signal according to an encryption key obtained by allocating a coefficient for encryption to each pixel of the array sensor.

Therefore, it is not necessary to perform complicated arithmetic operation processing for encryption of an image signal and it is possible to increase an encryption processing speed.

Moreover, in the encryption device as the embodiment, the encryption key generation unit generates the encryption key by allocating at least parts of the values of the electrical signals of the pixels to pixel positions different from pixel positions at which the values of the corresponding electrical signals are obtained.

Accordingly, it becomes more difficult to decipher the encryption key as compared to a case in which an encryption key in which values of electrical signals of pixels are allocated as they are to pixel positions at which the values of the electrical signals are obtained is used.

Therefore, it is possible to promote improvement of security.

In addition, in the encryption device as the embodiment, the encryption key generation unit generates the encryption key on the basis of photoelectric random numbers obtained in a frame period different from a frame period of the image signal that is an encryption target of the encryption unit.

Accordingly, the difficulty of inferring an encryption key from an encrypted image is enhanced.

Therefore, it is possible to promote improvement of security.

Further, in the encryption device as the embodiment, the encryption key generation unit re-acquires the photoelectric random numbers when uniformity in values of electrical signals in at least some pixels is recognized.

Accordingly, it is possible to prevent execution of encryption according to an encryption key based on random numbers with a low randomness. Therefore, it is possible to promote improvement of security.

Moreover, in the encryption device as the embodiment, the encryption key generation unit, the encryption unit, and the array sensor are configured in a single package.

Accordingly, it is possible to promote tamper-proofness in terms of hardware. Therefore, it is possible to promote improvement of security.

In addition, in the encryption device as the embodiment, the encryption key generation unit re-acquires the photoelectric random numbers upon detection of an unauthorized access from outside of the encryption device.

Accordingly, it is possible to perform encryption based on the re-acquired photoelectric random numbers after detection of the unauthorized access from the outside.

Therefore, it is possible to promote improvement of security.

Further, in the encryption device as the embodiment, the encryption key generation unit deletes the encryption key generated in the past from a memory upon re-acquisition of the photoelectric random numbers.

Accordingly, it is possible to prevent leaking of an encryption key used for encryption in the past.

Therefore, it is possible to prevent a signal encrypted in the past from being illegally deciphered to promote improvement of security.

Moreover, in the encryption device as the embodiment, the encryption key generation unit deletes an image signal that was a source of the photoelectric random numbers from the memory upon generation of the encryption key.

Accordingly, it is possible to prevent leaking of an image that was a source of photoelectric random numbers and inferring of the photoelectric random numbers.

Therefore, it is possible to promote improvement of security.

In addition, in the encryption device as the embodiment, the encryption unit encrypts a target signal through the stream encryption method.

Accordingly, pre-processing of encryption for the target signal is unnecessary. Therefore, it is possible to increase an encryption processing speed.

In addition, an encryption method of an embodiment is an encryption method including: generating an encryption key on the basis of photoelectric random numbers that are random numbers obtained on the basis of photoelectric conversion performed by an array sensor in which a plurality of pixels having light-receiving elements for visible light or non-visible light are one-dimensionally or two-dimensionally arranged and performing encryption of a target signal on the basis of the generated encryption key. The same operation and effects as those of the encryption device as the above-described embodiment can also be obtained by this encryption method.

In addition, a sensor device (sensor device 1) of an embodiment includes an array sensor (array sensor 2) in which a plurality of pixels having light-receiving elements for visible light or non-visible light are one-dimensionally or two-dimensionally arranged, and an encryption unit (amplitude control circuit 10 or 10A and encryption control unit 85) that performs encryption on readout signals from the pixels of the array sensor, as described in the first embodiment.

By performing encryption on the readout signals in this manner, it is possible to prevent an image signal as plaintext from being stored in the memory. Therefore, it is possible to promote improvement of security.

In addition, in the sensor device as an embodiment, the encryption unit includes a first amplitude control unit (amplitude control circuit 10) that performs amplitude control of a readout signal as an analog signal and performs encryption of the readout signal by executing amplitude control in response to an encryption key in the first amplitude control unit.

It is considerably difficult to acquire a readout signal as an analog signal from outside of the sensor device.

Therefore, it is possible to promote improvement of security.

Further, in the sensor device of the embodiment, the encryption unit includes a second amplitude control unit (amplitude control circuit 10A) that performs amplitude control of a readout signal converted into a digital signal through an A/D converter and performs encryption of the readout signal by executing amplitude control in response to an encryption key in the second amplitude control unit.

Accordingly, encryption is performed as amplitude control for the digital signal, and improvement of the accuracy of encryption processing is promoted as compared to a case in which amplitude control is performed on an analog signal. Therefore, when an encrypted image has been deciphered, improvement of reproducibility of the contents of the image can be promoted.

Furthermore, in the sensor device as the embodiment, the array sensor and the encryption unit are configured in a single package.

Accordingly, it is possible to promote tamper-proofness in terms of hardware. Therefore, it is possible to promote improvement of security.

In addition, in the sensor device as the embodiment, the encryption unit generates an encryption key on the basis of photoelectric random numbers that are random numbers obtained on the basis of photoelectric conversion performed by the array sensor and performs encryption on a readout signal on the basis of the generated encryption key.

Accordingly, it is possible to realize encryption that makes deciphering of an encryption key more difficult as compared to a case in which pseudo-random numbers are used.

Therefore, it is possible to promote improvement of security.

Further, in the sensor device as the embodiment, the encryption unit generates an encryption key on the basis of photoelectric random numbers obtained in a frame period different from a frame period of a readout signal that is an encryption target.

Accordingly, the difficulty of inferring an encryption key from an encrypted image is enhanced.

Therefore, it is possible to promote improvement of security.

Moreover, in the sensor device as the embodiment, the encryption unit re-acquires photoelectric random numbers upon detection of an unauthorized access from outside of the sensor device.

Accordingly, it is possible to perform encryption based on the re-acquired photoelectric random numbers after detection of the unauthorized access from the outside.

Therefore, it is possible to promote improvement of security.

In addition, in the sensor device as the embodiment, the encryption unit deletes an encryption key generated in the past from a memory upon re-acquisition of the photoelectric random numbers.

Accordingly, it is possible to prevent leaking of photoelectric random numbers used for encryption in the past.

Therefore, it is possible to prevent a signal encrypted in the past from being illegally deciphered to promote improvement of security.

Further, in the sensor device as the embodiment, the encryption unit deletes an image signal that was a source of photoelectric random numbers from the memory in response to generation of an encryption key.

Accordingly, it is possible to prevent leaking of an image that was a source of photoelectric random numbers and inferring of the photoelectric random numbers.

Therefore, it is possible to promote improvement of security.

In addition, another encryption method of an embodiment is an encryption method that performs encryption on readout signals from a plurality of pixels including light-receiving elements for visible light or non-visible light in an array sensor in which the pixels are one-dimensionally or two-dimensionally arranged. The same operation and effects as those of the sensor device as the above-described embodiment can also be obtained by this encryption method.

In addition, another sensor device (sensor device 1) of an embodiment includes an array sensor (array sensor 2) in which a plurality of pixels having light-receiving elements for visible light or non-visible light are one-dimensionally or two-dimensionally arranged, a detection unit (arithmetic operation unit 8: particularly, object region recognition unit 82 and class identification unit 83) that detects an area of a target reflected in an image as a target area on the basis of an image signal obtained through imaging in the array sensor, and an encryption unit (amplitude control circuit 10 or 10A and encryption control unit 85) that performs encryption for the target area in the image signal on the basis of information on the target area detected by the detection unit, as described in the second embodiment.

Accordingly, it is possible to perform encryption to a degree to which at least an individual is not identified in an image sensor with respect to an image signal obtained through imaging in the array sensor.

Therefore, an image receiving side need not consider measures for preventing leaking of personal information, and thus cost reduction can be promoted. In addition, it is possible to cause a part of an image to be visually recognized while concealing personal information depending on a deciphering key holding state in the image receiving side. That is, it is possible to realize image encryption for preventing excessive concealment of information. It is possible to prevent excessive information concealment which makes even ascertainment of an imaging place difficult, for example, which makes ascertainment of a store where an image is captured difficult, and thus it is possible to promote compatibility of concealment of personal information and prevention of excessive damage of usefulness of images.

In addition, in the sensor device as the embodiment, the encryption unit performs encryption of a whole image on the basis of a first encryption key and performs encryption of a target area on the basis of the first encryption key and a second encryption key different from the first encryption key as image signal encryption.

Accordingly, a part that can be deciphered in an image is distinguished by a deciphering key held by the image receiving side. Specifically, only an area other than a target area in an image can be deciphered when the image receiving side holds only a deciphering key corresponding to the first encryption key, and the whole image including the target area can be deciphered when the image receiving side holds deciphering keys corresponding to the first encryption key and the second encryption key.

Therefore, it is possible to realize a useful encryption method capable of changing a concealing level of information stepwise depending on a deciphering key held by the image receiving side.

Further, in the sensor device as the embodiment, the detection unit performs processing of recognizing a specific part of a target, and the encryption unit performs encryptions based on different encryption keys on the area of the specific part and other areas in the target area.

Accordingly, it is possible to change a concealing level of the target depending on a deciphering key held by the image receiving side. For example, when the target is a person, concealing levels such as concealment of the whole body and concealment of only the face can be distinguished. Therefore, it is possible to provide an encrypted image at an appropriate concealing level depending on an image use state.

Furthermore, the sensor device as the embodiment includes an analysis unit (arithmetic operation unit 8) that analyzes attributes or actions of the target and an output unit (interface 7) that outputs information representing analysis results of the analysis unit.

Accordingly, it is possible to provide analysis results with respect to the attributes and actions of the target even when the image receiving side does not hold a deciphering key.

In addition, in the sensor device as the embodiment, the detection unit detects a target by deciphering an image signal encrypted on the basis of the first encryption key through the on-the-fly method.

Accordingly, it is possible to reduce a likelihood of leaking of an image signal in a plaintext state.

Therefore, it is possible to promote improvement of security.

Further, in the sensor device as the embodiment, the encryption unit encrypts an image signal on the basis of a combined key obtained by combining a plurality of encryption keys.

Accordingly, the number of executions of necessary encryption processing is reduced in realization of encryption of changing a concealing level of personal information stepwise.

Therefore, it is possible to promote reduction in a processing load with respect to encryption.

Moreover, in the sensor device as the embodiment, the encryption unit performs encryption for a target area while tracking a target.

Accordingly, in a case where an image that is an encryption target is a moving image, it is possible to appropriately conceal a moving target.

In addition, in the sensor device as the embodiment, the encryption unit performs encryption of an image signal through the stream encryption method.

Accordingly, pre-processing of encryption for an image signal is unnecessary. Therefore, it is possible to increase an encryption processing speed.

Further, in the sensor device as the embodiment, the array sensor, the detection unit, and the encryption unit are configured in a single package.

Accordingly, it is possible to promote tamper-proofness in terms of hardware. Therefore, it is possible to promote improvement of security.

Furthermore, in the sensor device as the embodiment, the encryption unit generates an encryption key on the basis of photoelectric random numbers that are random numbers obtained on the basis of photoelectric conversion of the array sensor and performs encryption on an image signal on the basis of the generated encryption key.

Accordingly, it is possible to realize encryption that makes deciphering of an encryption key more difficult as compared to a case in which pseudo-random numbers are used.

Therefore, it is possible to promote improvement of security.

In addition, in the sensor device as the embodiment, the encryption unit performs encryption on readout signals from the pixels of the array sensor.

Accordingly, it is possible to prevent an image signal as plaintext from being stored in a memory in encryption.

Therefore, it is possible to promote improvement of security.

In addition, still another encryption method of an embodiment is an encryption method including: detecting an area of a target reflected in an image as a target area on the basis of an image signal obtained through imaging in an array sensor in which a plurality of pixels having light-receiving elements for visible light or non-visible light are one-dimensionally or two-dimensionally arranged; and performing encryption for the target area in the image signal on the basis of information on the detected target area.

The same operation and effects as those of the sensor device as the above-described embodiment can also be obtained by this encryption method.

Meanwhile, the effects described in the present specification are merely exemplary and other effects may be obtained.

<5. Present Technology>

The present technology can also employ the following configurations.

(1) An encryption device including:

an encryption key generation unit that generates an encryption key on the basis of photoelectric random numbers that are random numbers obtained on the basis of photoelectric conversion performed by an array sensor in which a plurality of pixels having light-receiving elements for visible light or non-visible light are one-dimensionally or two-dimensionally arranged; and an encryption unit that performs encryption of a target signal on the basis of the encryption key generated by the encryption key generation unit.

(2) The encryption device according to (1), wherein the encryption key generation unit generates the encryption key by acquiring values of electrical signals of the pixels obtained through the photoelectric conversion as the photoelectric random numbers.

(3) The encryption device according to (2), wherein the encryption unit performs encryption based on the encryption key on an image signal obtained through imaging in the array sensor.

(4) The encryption device according to (2) or (3), wherein the encryption key generation unit generates the encryption key in a form in which at least parts of the values of the electrical signals of the pixels are allocated to pixel positions different from pixel positions at which the values of the corresponding electrical signals are obtained.

(5) The encryption device according to (3) or (4), wherein the encryption key generation unit generates the encryption key on the basis of the photoelectric random numbers obtained in a frame period different from a frame period of the image signal that is an encryption target of the encryption unit.

(6) The encryption device according to any one of (2) to (5), wherein the encryption key generation unit re-acquires the photoelectric random numbers when the uniformity of the values of the electrical signals in at least some of the pixels is recognized.

(7) The encryption device according to any one of (1) to (6), wherein the encryption key generation unit, the encryption unit, and the array sensor are configured in a single package.

(8) The encryption device according to any one of (1) to (7), wherein the encryption key generation unit re-acquires the photoelectric random numbers upon detection of an unauthorized access from outside of the encryption device.

(9) The encryption device according to (8), wherein the encryption key generation unit deletes the encryption key generated in the past from a memory upon re-acquisition of the photoelectric random numbers.

(10) The encryption device according to any one of (1) to (9), wherein the encryption key generation unit deletes an image signal that was a source of the photoelectric random numbers from a memory upon generation of the encryption key.

(11) The encryption device according to any one of (1) to (10),
wherein the encryption unit encrypts the target signal through a stream encryption method.

REFERENCE SIGNS LIST

1 Sensor device
2 Array sensor
3 ADC/pixel selector
4 Buffer
5 Logic unit
6 Memory
7 Interface
8 Arithmetic operation unit
10, 10A Amplitude control circuit
20 Bounding box
21 ROI,
82 Object region recognition unit
83 Class identification unit
85 Encryption control unit
86 Unauthorized access detection unit
100 Camera apparatus

The invention claimed is:

1. An encryption device comprising:
an encryption key generator that generates an encryption key based on photoelectric random numbers that are random numbers obtained based on photoelectric conversion performed by an array sensor in which a plurality of pixels having light-receiving elements for visible light or non-visible light are one-dimensionally or two-dimensionally arranged; and
encryption circuitry that performs encryption of a target signal based on the encryption key generated by the encryption key generator,
wherein the encryption key generator is configured to
acquire values of electrical signals of the pixels obtained through the photoelectric conversion as the photoelectric random numbers,
check uniformity in the values of the electrical signals of the pixels with respect to a seed frame,
obtain new photoelectric random numbers in response to determining that the values of the electrical signals in a threshold number of the pixels or more have uniformity, and
generate the encryption key using the photoelectric random numbers in response to determining that the values of the electrical signals in less than the threshold number of the pixels have uniformity.

2. The encryption device according to claim 1,
wherein the encryption circuitry performs encryption based on the encryption key on an image signal obtained through imaging in the array sensor.

3. The encryption device according to claim 2,
wherein the encryption key generator generates the encryption key based on the photoelectric random numbers obtained in a frame period different from a frame period of the image signal that is an encryption target of the encryption circuitry.

4. The encryption device according to claim 1,
wherein the encryption key generator generates the encryption key in a form in which at least parts of the values of the electrical signals of the pixels are allocated to pixel positions different from pixel positions at which the values of the corresponding electrical signals are obtained.

5. The encryption device according to claim 1,
wherein the encryption key generator, the encryption circuitry, and the array sensor are configured in a single package.

6. The encryption device according to claim 1,
wherein the encryption key generator re-acquires the photoelectric random numbers upon detection of an unauthorized access from outside of the encryption device.

7. The encryption device according to claim 6,
wherein the encryption key generator deletes the encryption key generated in the past from a memory upon re-acquisition of the photoelectric random numbers.

8. The encryption device according to claim 1,
wherein the encryption key generator deletes an image signal that was a source of the photoelectric random numbers from a memory upon generation of the encryption key.

9. The encryption device according to claim 1,
wherein the encryption circuitry encrypts the target signal through a stream encryption method.

10. An encryption method comprising:
generating an encryption key based on photoelectric random numbers that are random numbers obtained based on photoelectric conversion performed by an array sensor in which a plurality of pixels having light-receiving elements for visible light or non-visible light are one-dimensionally or two-dimensionally arranged; and
performing encryption of a target signal based on the generated encryption key,
wherein generating the encryption key includes
acquiring values of electrical signals of the pixels obtained through the photoelectric conversion as the photoelectric random numbers,
check uniformity in the values of the electrical signals of the pixels with respect to a seed frame,
obtaining new photoelectric random numbers in response to determining that the values of the electrical signals in a threshold number of the pixels or more have uniformity, and
generating the encryption key using the photoelectric random numbers in response to determining that the values of the electrical signals in less than the threshold number of pixels have uniformity.

11. A non-transitory computer readable medium storing instructions that, when executed by an electronic processor, cause the electronic processor to perform a set of operations comprising:
generating an encryption key based on photoelectric random numbers that are random numbers obtained based on photoelectric conversion performed by an array sensor in which a plurality of pixels having light-receiving elements for visible light or non-visible light are one-dimensionally or two-dimensionally arranged; and
performing encryption of a target signal based on the generated encryption key,
wherein generating the encryption key includes
acquiring values of electrical signals of the pixels obtained through the photoelectric conversion as the photoelectric random numbers,
checking uniformity in the values of the electrical signals of the pixels with respect to a seed frame, obtaining new photoelectric random numbers in response to determining that the values of the electrical signals in a threshold number of the pixels or more, and generating the encryption key using the photoelectric random numbers in response to determining that the values of the electrical signals in less than the threshold number of pixels have uniformity.

* * * * *